United States Patent [19]

Duchin

[11] Patent Number: 4,683,635

[45] Date of Patent: Aug. 4, 1987

[54] TAG DISPENSING AND ATTACHING METHOD AND APPARATUS

[75] Inventor: Daniel Duchin, Long Island City, N.Y.

[73] Assignee: Monarch Marking Systems, Inc., Dayton, Ohio

[21] Appl. No.: 829,579

[22] Filed: Feb. 14, 1986

Related U.S. Application Data

[60] Division of Ser. No. 654,062, Sep. 25, 1984, Pat. No. 4,610,384, which is a continuation-in-part of Ser. No. 553,080, Nov. 18, 1983, Pat. No. 4,610,385.

[51] Int. Cl.[4] .............. B23P 11/00

[52] U.S. Cl. .............. 29/432; 221/248; 227/67

[58] Field of Search .............. 221/248; 227/67, 68, 227/19, 79, 80, 95, 120, 156; 29/432

[56] References Cited

U.S. PATENT DOCUMENTS

| | | | |
|---|---|---|---|
| 3,734,375 | 5/1973 | Bone et al. | 227/67 |
| 3,880,339 | 4/1975 | Bone | 227/8 |
| 3,896,713 | 7/1975 | Mayo | 227/67 X |
| 4,049,179 | 9/1977 | Jenkins | 227/67 |
| 4,237,779 | 12/1980 | Kunreuther | 227/67 X |
| 4,315,587 | 2/1982 | Ritter et al. | 227/67 |
| 4,323,183 | 4/1982 | Duchin | 227/67 X |

FOREIGN PATENT DOCUMENTS

| | | |
|---|---|---|
| 91410 | 12/1983 | European Pat. Off. . |
| 53-38998 | 10/1978 | Japan . |
| 55-16544 | 9/1980 | Japan . |
| 57-16824 | 4/1982 | Japan . |

*Primary Examiner*—Paul A. Bell

*Attorney, Agent, or Firm*—Joseph J. Grass

[57] ABSTRACT

First and second separately actuatable triggers are mounted to a housing which carries a hollow needle through which a fastener is dispensed. The needle is mounted to the housing for movement between original and extended positions. The article to be tagged is situated adjacent the front of the housing. When the first trigger is depressed, a tag is moved from a stack on the housing into alignment with the needle as the needle is moved forward to pierce the tag and article. Also, a fastener is fed into the needle. When the second trigger is depressed, the fastener is moved through the needle such that the T-bar end is situated behind the article and the needle retracts to its original position. The apparatus is pulled away from the article, leaving the tag affixed by the fastener. The apparatus is light-weight, easily manipulatable, and can be operated by a single hand.

9 Claims, 30 Drawing Figures

FIG. 7
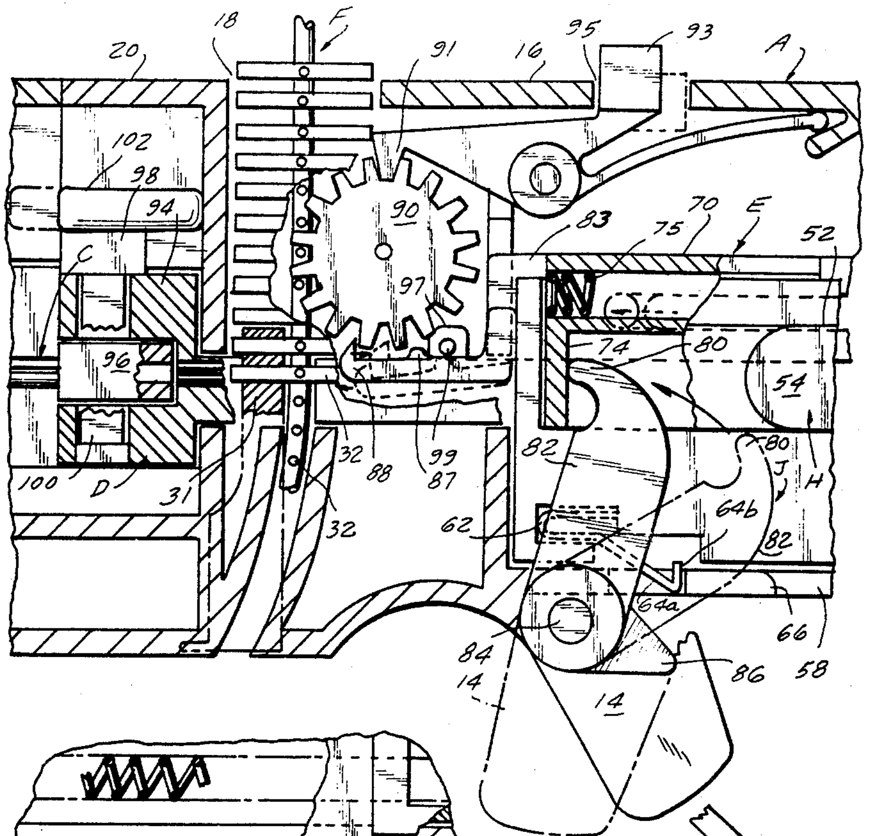
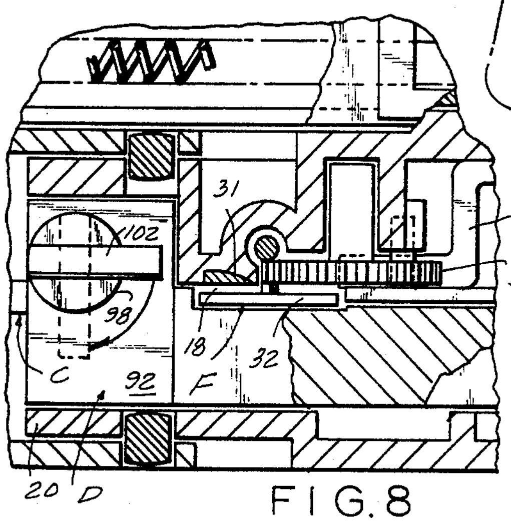
FIG. 8

FIG-15
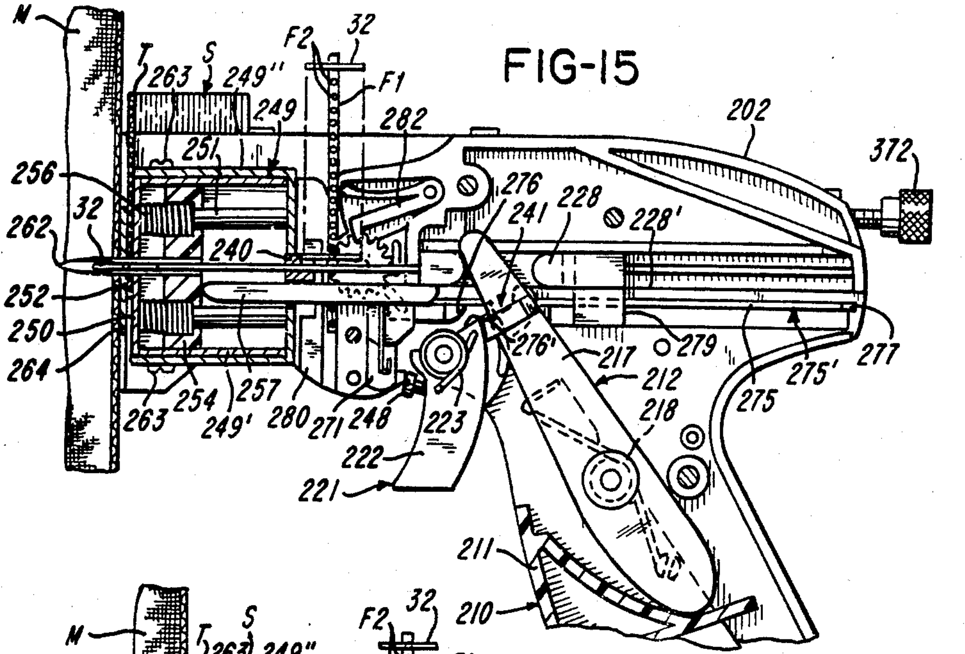
FIG-16
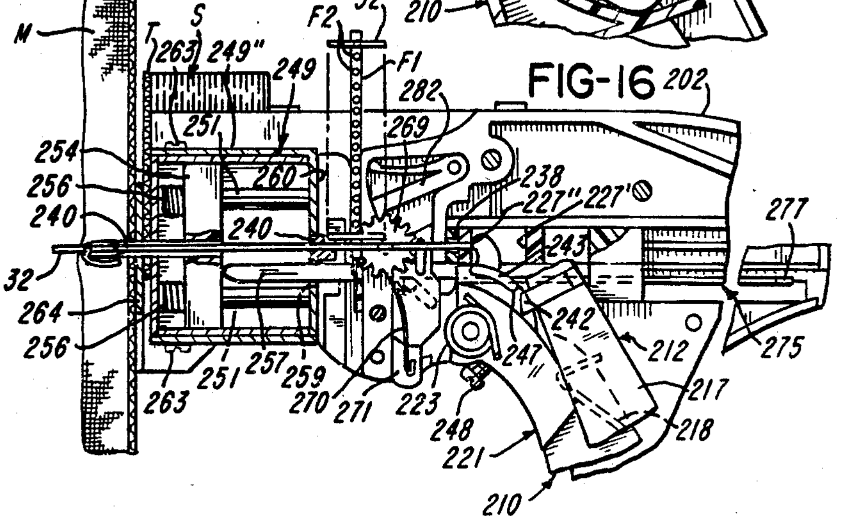
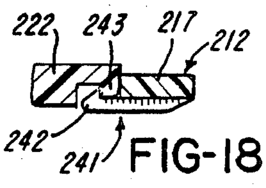
FIG-18
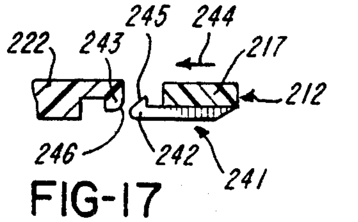
FIG-17

FIG-20
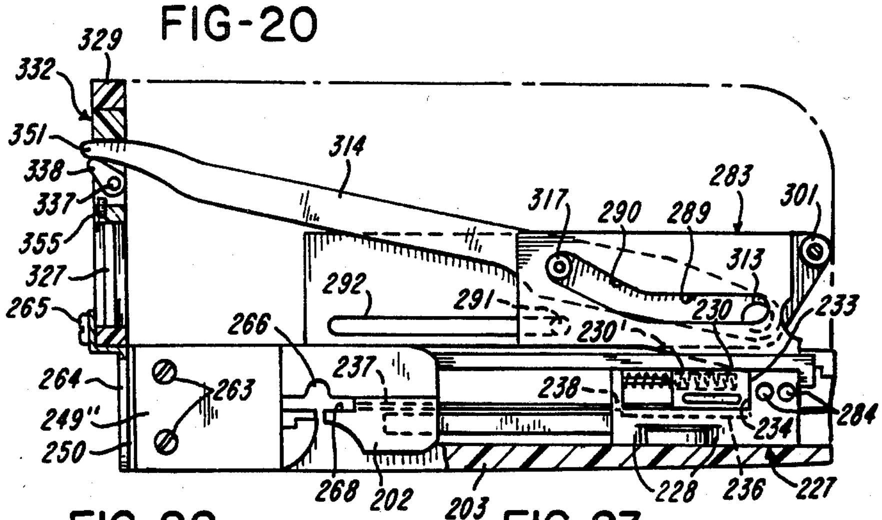
FIG-22
FIG-23
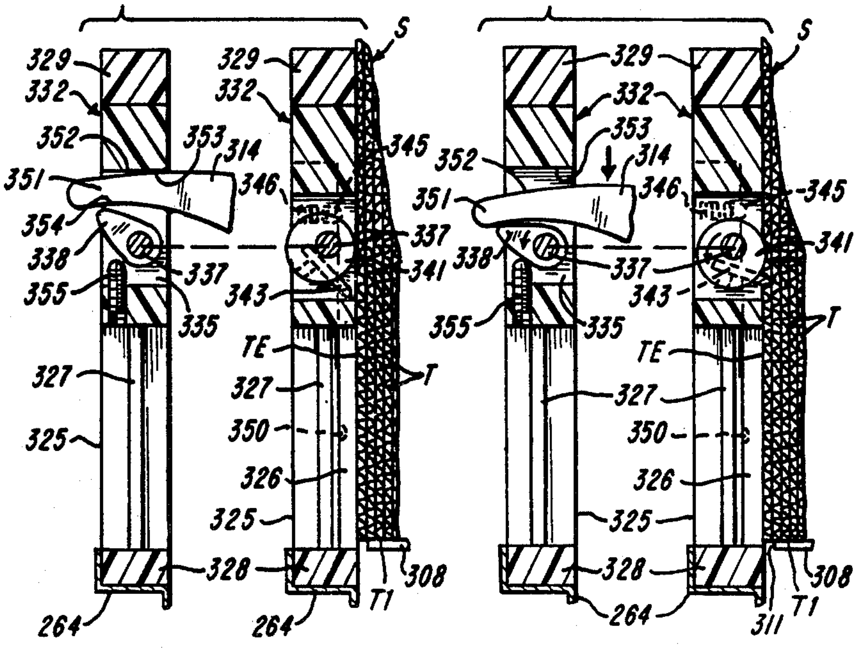

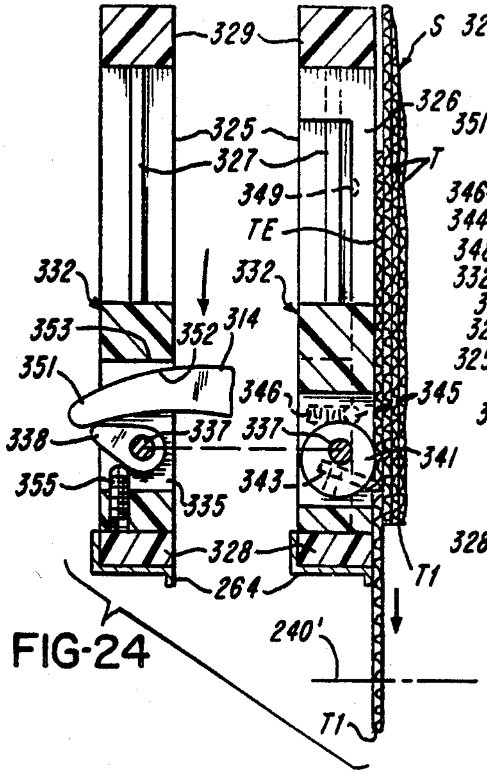
FIG-24
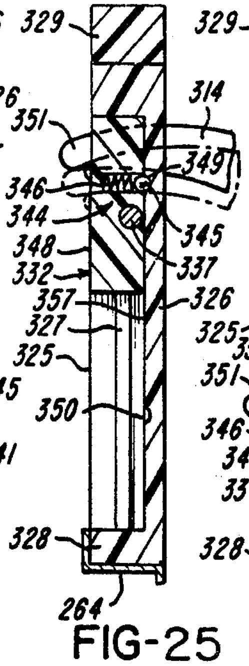
FIG-25
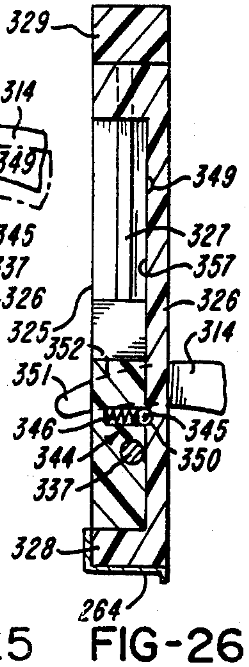
FIG-26
FIG-27
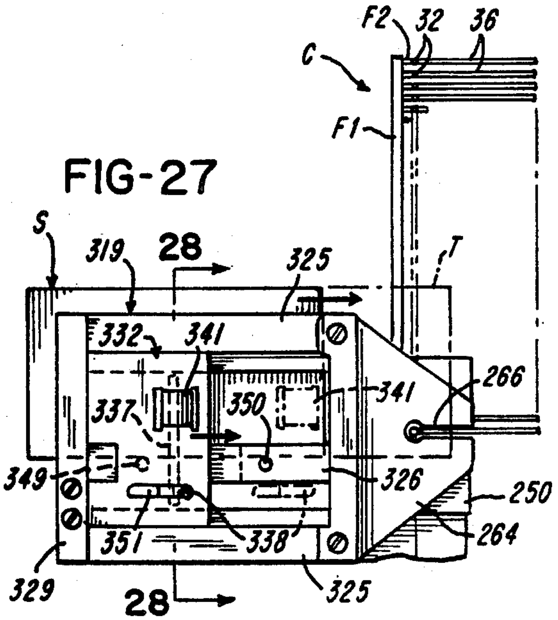
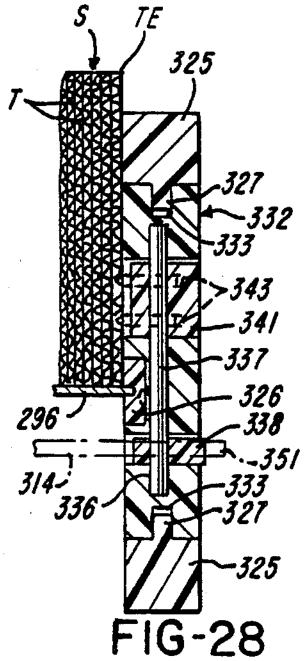
FIG-28

TAG DISPENSING AND ATTACHING METHOD AND APPARATUS

Cross-Reference to Related Application

This application is a division of Ser. No. 654,062, filed Sept. 25, 1984, now U.S. Pat. No. 4,610,384, which is a continuation-in-part of patent application Ser. No. 553,080, filed Nov. 18, 1983, now U.S. Pat. No. 4,610,385.

BACKGROUND OF THE INVENTION

1. Field of the Invention

The present invention relates to tag attaching method and apparatus and, more particularly, to method and apparatus which automatically dispenses a tag and mounts the tag to an article by means of a plastic fastener.

2 Brief Description of the Prior Art

The following patents are made of record: U.S. Pat. Nos. 2,331,252; 3,012,484; 3,022,508; 3,385,498; 3,595,460; 3,598,025; 3,734,375; 3,880,339; 3,896,713; 3,898,725; 3,948,128; 4,040,555; 4,049,179; 3,237,779; 4,315,587; 4,323,183; European patent application No. 83850056.9, Publication No. 0 0901 410 published Oct. 12, 1983; Japanese patent application No. 54-20935, patent laid-open No. 55-116544, laid open Sept. 8, 1980; Japanese patent application No. 50-120766, publication No. 57-16824 published Apr. 8, 1982; and Japanese patent publication No. 53-38998, published Oct. 18, 1978 based on application No. 49-53507 filed May 14, 1974, now patent No. 958,794 registered June 14, 1979.

Plastic fasteners, such as the type sold by Monarch Marking Systems, Inc. of Dayton, Oh. under the registered trademark TAGGER TAIL and also by other manufacturers, are widely used in the retail industry for attaching labels, tags, and other identifying or information containing objects to a wide variety of soft goods articles for inventory control and pricing purposes. Literally millions of these fasteners are applied to articles during the course of a year, most of which are applied by operators using manually-actuated, hand-held plastic fastener attachers or guns which are sold by a variety of companies for this purpose. Marking systems of this type have been highly commercially successful because of the low price of the fasteners, the ease and relatively low skill required for the attaching operation, and because of the security which is provided due to the structure of the fastener and the material from which it is made, which substantially reduce problems associated with tag switching.

The tag mounting procedure is quite simple. A magazine or clip of plastic fasteners is loaded into the attacher, which is held in one hand of the operator. The operator holds the tag against the article to be tagged in the other hand. The attacher is moved towards the article until the needle fixed to and extending from the front of the attacher penetrates the tag and the article. The operator then actuates the attacher by depressing a trigger-like member such that a single plastic fastener is severed from the clip and dispensed through the needle. This causes the T-bar end of the fastener to be situated behind the article, with the filament penetrating the tag and the article. The attacher is then moved away from the article, withdrawing the needle therefrom, and leaving the fastener in place with the filament of the fastener through a hole in the article and the tag, the T-bar end of the fastener lodged behind the article, and the paddle end of the fastener situated in front of the tag. As the operator releases the trigger, the next plastic fastener is moved into position such that the operation can be rapidly repeated.

Notwithstanding the fact that the plastic fasteners are quite inexpensive and, thus, the per unit tagging costs are low, the aggregate costs involved in the tagging operation are high. This is because virtually every article of soft goods which is sold must be tagged in this manner, requiring a great deal of time and labor. . Users and manufacturers of this type of system are continually seeking methods of reducing the overall cost of the marking operation. An analysis of the tagging operation indicates that a significant portion of the time and motion required is a result of the necessity for the operator to remove a single tag from a stack of tags and place it on the needle by inserting the needle through a pre-punched hole in the tag prior to the use of the attacher. Thus, a reduction in time and labor would result if the tag positioning operation could be facilitated.

In my United States Patent No. 4,323,183, issued Apr. 6, 1982 and entitled "Tag Dispenser For Hand-Held Attacher," I describe an apparatus designed to facilitate the tag positioning operation and, thereby, reduce the overall cost of the tag mounting procedure. The device described in my patent includes a support to which a conventional plastic fastener attacher is movably mounted and upon which is situated a stack of tags. A slide is utilized to move a tag along the plane between the stack and a position in alignment with the needle of the attacher.

The attacher is mounted to the support by a plate which is movable relative to the support between a position wherein the needle is remote from the plane of slide movement and a position where the needle intersects the plane. As the needle intersects the plane of the slide, it pierces the tag which is held in position by an anvil with a needle receiving opening. The attacher is then actuated in the conventional manner. Slide movement may be accomplished manually or automatically in conjunction with the movement of the attacher by using a mechanical linkage, an electrically driven motor, a solenoid, or a pneumatic cylinder.

The device described in the aforementioned patent functions acceptably, but requires that the article and the support be held stationary as the attacher is moved forward relative to the support, to enable the needle to pierce the tag and the article. The attacher must be held in the forward position, against the action of a spring, as it is actuated by depressing a trigger to dispense the plastic fastener. Thus, two separate motions were required—one to move the fastener forward against the action of the spring, and a second to squeeze the trigger while the attacher was held in the forward position. It has been found that after repeated operations of this device, the operator often became fatigued and, thus, some of the time saving advantage of this device was lost. In addition, an operator using this device often pricked her/his finger as the needle burst through the tag and into the article, as the attacher was pushed forward.

It is, therefore, a prime object of the present invention to provide a tag dispensing and attaching apparatus which will facilitate the tagging operation without fatiguing the operator.

It is another object of the present invention to provide a tag dispensing and attaching apparatus which is operated entirely by the squeezing of triggers.

It is another object of the present invention to provide a tag dispensing and attaching apparatus wherein the fastener attaching portion need not be moved relative to the tag dispensing portion.

It is another object of the present invention to provide a tag dispensing and attaching apparatus which is light in weight, easily manipulatable, and can be operated by a single hand of the operator.

It is another object of the present invention to provide a tag dispensing and attaching apparatus which is mechanically simple and operates reliably.

It is another object of the present invention to provide a tag dispensing and attaching apparatus which can be constructed of relatively inexpensive parts which cooperate together for a long, useful life with a minimum of maintenance.

It is another object of the present invention to provide a tag dispensing and attaching apparatus which greatly reduces the possibility of injury to the operator from an advancing needle.

It is another object of the present invention to provide a tag dispensing and attaching apparatus which utilizes conventional plastic fasteners.

It is another object of the present invention to provide a tag dispensing and attaching apparatus which can be used with large numbers of tags of a variety of different dimensions.

It is another object of the present invention to provide a tag dispensing and attaching apparatus which is primarily designed for hand-held use, but which can easily be adapted to be powered by external means.

It is another object of the present invention to provide a hand-held tag attacher which is completely manually powered using only one hand, wherein manual actuating means are provided to move a tag feeder to advance a tag to an attaching position, to move the bar section of a fastener through the tag and merchandise, and to advance the next fastener to the dispensing position.

It is another object of the present invention to provide a tag feed mechanism adapted for use in a manually operated hand-held tag attacher which includes tag engaging means actuated by the driving force which positions a tag in alignment with the attacher needle.

It is another object of the present invention to provide a tag feed mechanism adapted for use in a manually operated hand-held tag attacher which includes tag engaging means which are deactuated as the tag positioning slide moves to its retracted position.

It is another object of the present invention to provide apparatus for feeding an attaching tag which includes a hand-held attacher with a manually operated actuator and a movably mounted needle wherein initial actuation of the actuator causes feeding of a tag into alignment with the needle and further actuation of the actuator causes the needle to move to an extended position to penetrate the tag.

It is another object of the present invention to provide a hand-held tag attacher which is completely manually powered by the operation through repetitive cycles using only one hand, wherein manual actuating means are used to move a tag feeder to advance a tag from a hopper to an attaching position, to move a push rod to push a bar section of a fastener through a tag and merchandise, and to advance fasteners using a fastener advancing mechanism to a dispensing position using mechanically connected elements controlled by the actuating means.

It is another object of the invention to provide a simple and reliable arrangement for separating and feeding one tag at a time from a stack in a hopper to an attaching position in a hand-held tag attacher.

It is another object of the invention to provide simple and reliable method and apparatus for separating and feeding one-tag-at-a-time from a stack in a hopper to an attaching position in a hand-held tag attacher in which the endmost tag in the hopper is engaged by one or more feed pins, and thereafter the feed pin or pins are moved toward a forward position while the pin or pins remain engaged with the endmost tag.

It is another object of the invention to provide a hand-held tag attacher powered solely by the operator in which manually operable actuating means moves a slide which moves a tag feeder, a mechanism for advancing fasteners and a push rod for ejecting fasteners.

It is an object of the invention to provide a hand-held tag attacher with a hopper for holding a stack of tags, which meets some or all of the above-described objects, wherein the operator can sense the development of a jam condition so that the operator can cease applying force to the actuating means.

In accordance with the present invention, tag attaching apparatus is provided comprising a housing, actuating means, and a hollow needle through which a fastener is dispensed. Means are provided for mounting the needle to the housing for movement between an original position and an extended position. Means are provided for moving a fastener through the needle. Means are provided for moving the needle mounting means from an original position to the extended position, in response to actuation of the actuating means. Means are also provided for causing the fastener moving means to move the fastener through the needle, in response to further actuation of the actuating means.

The means for engaging the needle mounting means includes first slide means mounted within the housing for movement between a first position, remote from the needle mounting means, and a second position, wherein the needle mounting means is operably engaged. The fastener moving means includes second slide means movable with and relative L to said first slide means.

The second slide means is mounted for movement relative to the first slide means between a first relative position and a second relative position. The second slide means carries a plunger having a tip. The plunger is movable between an initial position, wherein the tip is remote from the needle, a second position, wherein the tip is within the needle, and a third position wherein the tip pushes the fastener out of the needle. The tip is within the needle when the first slide is in its second position and the second slide is in its first relative position and pushes the fastener out of the needle when the second slide is in the second relative position.

Means are provided for urging the first slide means towards the first position. Means are also provided for latching the first slide means in its second position.

The actuating means includes first and second actuators, preferably in the form of individually actuatable triggers. The first actuator is effective, when actuated, to move the first slide means from its first position to its second position. The second actuator is effective, when actuated, to release the latching means. Thus, when the second actuator is actuated, the first slide means is returned to its first position by the urging means.

The second actuator is also effective, when actuated, to second relative position with respect to the first slide. Thus, actuation of the second actuator causes the plunger to complete its movement through the needle, thereby causing the fastener to be dispensed.

The apparatus also includes tag dispensing means. The tag dispensing means is operably connected to the actuating means. The tag dispensing means is effective, upon actuation of the actuating means, to move a tag into alignment with the needle.

The tag dispensing means is actuated, by the actuating means, prior to the needle mounting means reaching its extended position. The tag is positioned in alignment with the needle prior to the needle mounting means reaching its extended position. Thus, the tip of the needle can pierce the tag and, thereafter, retain the tag in the aligned position.

The apparatus also includes a tag retaining means. The tag dispensing means includes tag slide means movable between a first position, aligned with the tag retaining means, wherein in a tag is engaged, and a second position wherein the engaged tag is aligned with the needle. Means are provided for operably connecting the actuating means and the tag slide means.

This connecting means includes an arm movable between first and second positions in response to the actuation of the actuating means. A pin is carried by the arm. A lever is mounted on the housing for pivotal movement between first and second positions. The lever carries a cam track into which the pin extends. As the arm is advanced, the lever pivots, causing the tag slide means attached thereto to move a tag into alignment with the needle.

The cam track comprises a continuous loop between first and second points. The path includes first section extending in a substantially straight line between the points and a second section extending between the points and including first and second parts. The first and second parts intersect at an angle. Preferably, the angle is less than 180°.

As the arm is advanced, the pin moves along the second track section. As it moves along the first part, a tag is moved into alignment with the needle. As it moves along the second part, the slide retracts. The pin returns to its original position, without moving the slide, along the first track section.

In accordance with another aspect of the present invention, a tag feed mechanism adapted for use in a hand-held tag attacher is provided. The fastener attacher is of the type having a manually operated actuator. The mechanism includes means for moving a tag into alignment in the attacher. Means are provided for operably connecting the actuator and the tag moving means for applying a driving force to the tag moving means to move same in response to the actuation of the actuator. The moving means includes means, effective when actuated, for engaging a tag. The engaging means is actuated by the application of the driving force by the connecting means to the moving means.

Spring means are provided which are operably active on the connecting means for urging the tag moving means to a position remote from the attacher. The engaging means is automatically released as the tag moving means moves toward the remote position.

The tag moving means moves between the position remote from the attacher and a position wherein an engaged tag is in alignment with the attacher. Means are provided for retaining the tag in alignment with the attacher as the tag moving means moves from the aligned position towards the remote position.

The tag moving means further comprises means for limiting the degree of actuation of the tag engaging means. The tag moving means also comprises means for adjusting the limiting means to alter the degree to which the engaging means is actuated.

Means are provided for applying a force to the tag moving means to resist movement of the tag moving means from the remote position. The application of the driving force causes the tag engaging means to be actuated and, thereafter, causes the movement resisting force to be overcome.

The tag engaging means includes an actuating portion and a tag gripping portion. The actuating portion is operably engaged by the connecting means. The actuating portion is a tag gripping portion. The actuating portion is operably engaged by the connecting means. The actuating portion is movably mounted relative to the tag moving means between a position wherein the gripping portion is inactive with respect to the tag and a position wherein the gripping portion is active on the tag. The application of the driving force by the connecting means causes the actuating portion to move from the inactive position towards the active position.

The actuating portion, in the active position, functions to transfer the driving force from the connecting means to the tag moving means to move same. Preferably, the force receiving portion of the tag moving means comprises the limiting means. The limiting means preferably comprises a position adjustable member rotatably mounted on the tag moving means at a point proximate the gripping portion of the tag engaging means.

Relative movement between the tag moving means and the tag, in a direction away from the actuator, causes the gripping portion to release the tag. This relative movement also causes the actuation portion to move from the active position towards its inactive position.

The application of the driving force causes the tag engaging means to be actuated through the movement of the actuating portion towards the active position and, thereafter, causes the movement resisting force to be overcome. The driving force is transferred from the connecting means to the force receiving portion of the tag moving means through the actuating portion so as to overcome the movement resisting force.

The actuating portion comprises lobe means and the gripping portion comprises disc-like means and tag engaging pin means mounted on the disc-like means. A shaft is provided to which the lobe means and the disc-like means are fixedly mounted. Means are provided for rotatably mounting the shaft on the moving means.

Preferably, the axis of the disc-like means is radially offset from the axis of the shaft. This permits the rotational force applied to the disc-like means to be mechanically enhanced as it is applied to the tag engaging pin mounted thereon.

In accordance with another aspect of the present invention, apparatus is provided for feeding tags and attaching same by means of a fastener. The apparatus includes a hand-held fastener attacher with a manually actuatable actuator. A needle for dispensing fasteners is movably mounted to the attacher. Means are provided which are adapted, when actuated, to move the needle between retracted and extended positions. Means, adapted when actuated, are provided for feeding a tag into alignment with the needle. Means are provided for operable mechanically connecting the tag feed means, the needle moving means, and the actuator. The connecting means comprises means responsive to the initial actuation of the actuator to actuate the tag feed means to move a tag into alignment with the needle. The connecting means are responsive to further actuation of the actuator to actuate the needle moving means to move the needle from the retracted to the extended position.

The connecting means includes cam means operably connected to the actuator and cam follower means operably connected to the tag feed means. The cam means includes first and second sections. Relative movement between the cam means and the cam follower means along the first cam section results in actuation of the feed means. Relative movement second cam section occurs during actuation of the needle moving means.

Relative movement of the cam means and the cam follower means along the first cam section occurs during initial actuation of the actuator. Relative movement of the cam means and the cam follower means along the second cam section occurs during further actuation of the actuator.

The needle moving means moves the needle in a given direction. The second cam section is substantially parallel to the given direction. The first cam section extends in a different direction from the given direction.

The tag feed means moves, when actuated, in a direction substantially perpendicular to the given direction. The direction of the first cam section is between the given direction and the direction perpendicular thereto.

To these and to such other objects which may hereinafter appear, the present invention relates to tag dispensing and attaching apparatus, as described in detail in the following specification, and recited in the annexed claims, taken together with the accompanying drawings, wherein like numerals refer to like parts, and in which:

FIG. 7 is an enlarged fragmentary side view of a portion of the tag dispensing and attaching apparatus of the present invention;

FIG. 8 is an enlarged fragmentary top view of the portion of the tag dispensing and attaching apparatus of the present inven illustrated in FIG. 7;

FIG. 15 is a view similar to FIG. 14, but showing a first actuator in an actuated position and a lever latched to a second actuator, with a push rod in a partially actuated position;

FIG. 16 is a view similar to FIGS. 14 and 15, but showing the push rod in its actuated position and showing the latch as having been tripped;

FIG. 17 is a fragmentary partly sectional view showing the lever moving into latching engagement toward the second actuator;

FIG. 18 is a view similar to FIG. 17, but showing the lever latched to the second actuator;

FIG. 20 is a generally horizontal sectional view taken along line 20—20 of FIG. 14;

FIG. 22 is a view showing two sections with the tag feeder in its initial or retracted position and with the feed pin in its ineffective position;

FIG. 23 is a view similar to FIG. 22 with the tag feeder in its initial retracted position, but with the feed pin in its effective feeding position;

FIG. 24 is a view similar to FIGS. 22 and 23, with the tag feeder in its advanced or actuated position and the endmost tag in the stack in its advanced or attaching position;

FIG. 25 is a sectional view similar to one of the sections in FIG. 22 but along a plane showing structure for resisting initial advance of the tag feeder;

FIG. 26 is a view similar to FIG. 25, but showing the tag feeder in its advanced position;

FIG. 27 is a front elevational view of the tag attacher;

FIG. 28 is a sectional view generally long line 28—28 in FIG. 27;

Figure 1:
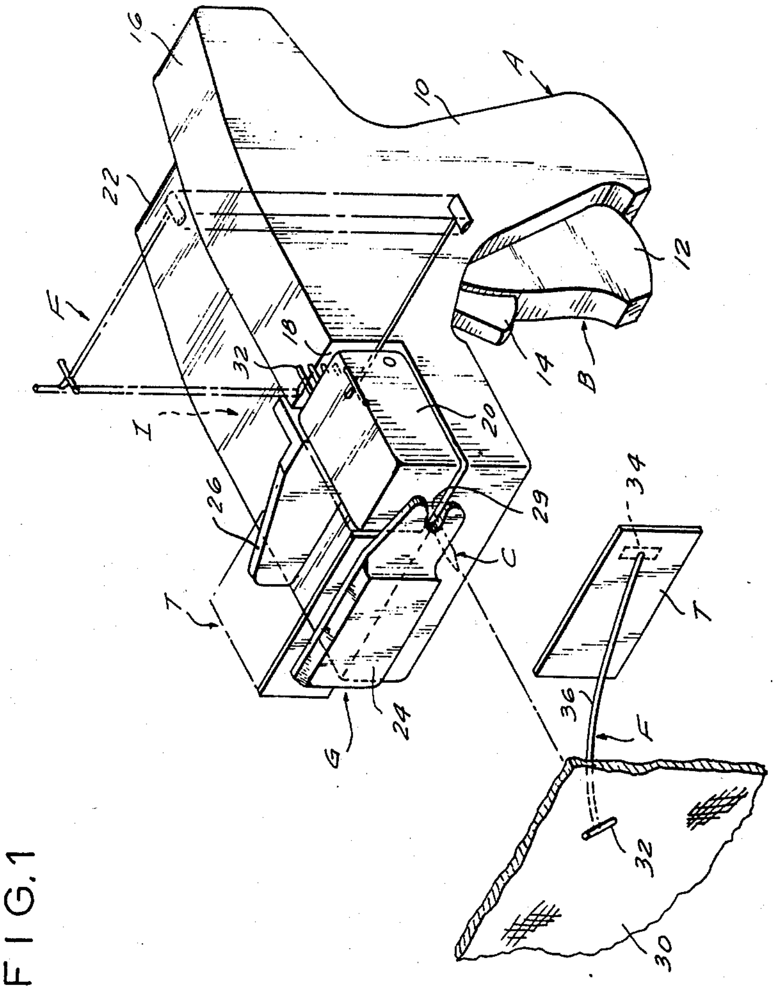
FIG. 1 is an isometric view of the tag dispensing and attaching apparatus of the present invention.
Figure 2:
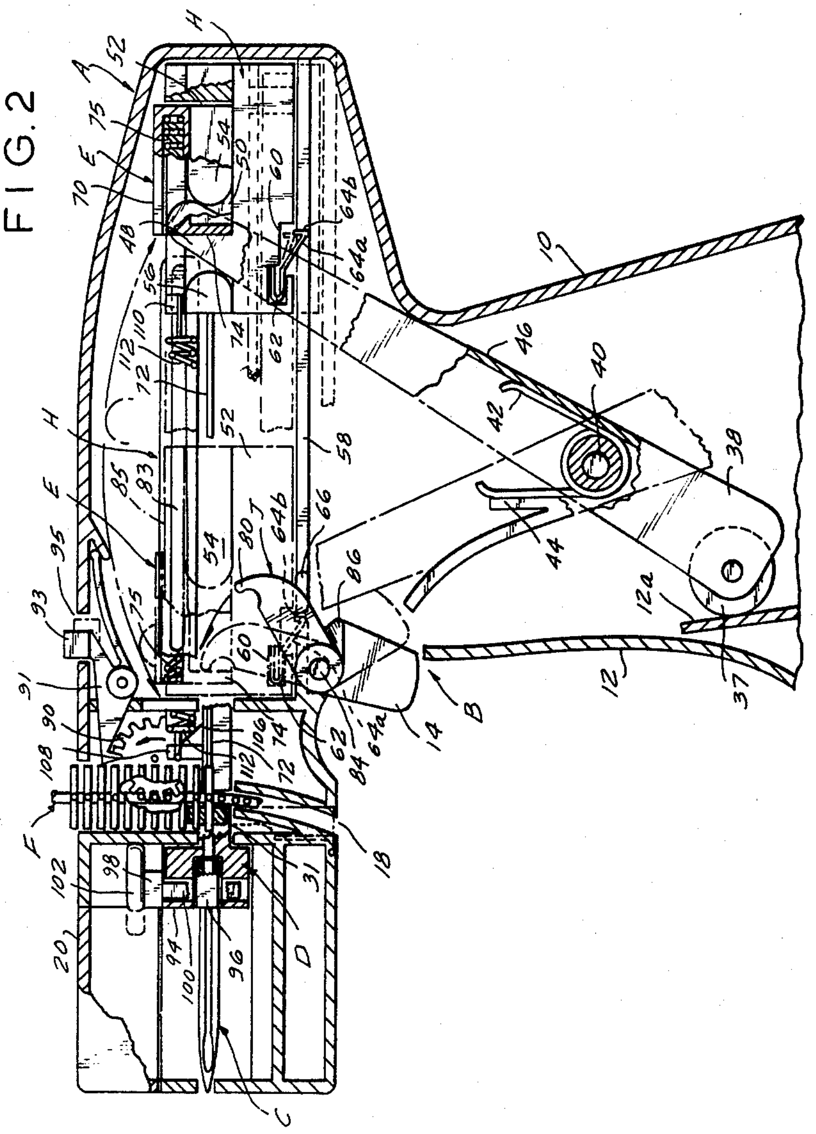
FIG. 2 is a side cross-sectional view of the tag dispensing and attaching apparatus of the present invention, illustrating the various positions of the first and second slides.

As shown in FIGS. 1 and 2, the tag dispensing and attaching apparatus of the present invention comprises a molded plastic pistol-grip type housing, generally designated A. Depressable type actuating means, generally designated B, are situated on the lower portion of housing A. A hollow needle, generally designated C, is mounted on the forward portion of housing A. Needle C is of the conventional type, with an internal bore and a side slot which permits the T-bar end of a plastic fastener F to move through its length with the filament of the fastener extending through the slot. Means, generally designated D, are provided for movably mounting the needle C to housing A for movement between an original position and an extended position. Means, generally designated E, are provided for moving the T-bar end of the fastener F through needle C. Means, generally designated G, are provided for aligning a tag T with needle C.

Means, generally designated H, are provided for moving needle mounting means D. Means I are provided for connecting actuating means B to tag aligning means G. Means H and I are effective, when actuating means B is actuated, to cause tag aligning means G to align a tag T with needle C and to move needle C from its original position to an extended position to pierce the aligned tag T. Means, generally designated J, are provided for causing fastener moving means E to move a fastener through needle C.

Housing A consists of a grip portion 10 designed to be grasped by the hand of the operator with the fingers of the operator encircling actuating means B. Actuating means B consists of two separately depressable triggers 12 and 14. Trigger 14 is situated to align with the index finger of the operator, whereas trigger 12 is situated to align with the remaining fingers of the operator. This permits triggers 12 and 14 to be separately actuated, in sequence, by the hand of the operator.

The upper portion of housing A includes a main section 16 having a slot 18 at the top thereof into which a clip or assembly of interconnected plastic fasteners F may be received. Forward of slot 18, at the top of housing section 16, is a pivotally connected hood section 20 which provides access to the needle engaging mechanism to permit removal of the needle. Hood section 20 also functions to prevent dirt from entering the mechanism and protects the operator from being injured by the forward advancement of needle C.

Extending outwardly from the right side of housing A, as seen in FIG. 1, is the tag dispensing portion of the present invention. The mechanism for the tag dispensing portion of the present invention is situated within section 22 of housing A. A stack of tags T is situated on the upper surface of housing section 22, adjacent hood 20. The stack of tags T is retained between an anvil 24, fixedly mounted to the front of housing A, and a spring-loaded pressure plate 26 which is mounted to housing A for movement along the top surface of section 22, so as to urge the tag stack against the interior surface of anvil 24.

Figure 4:
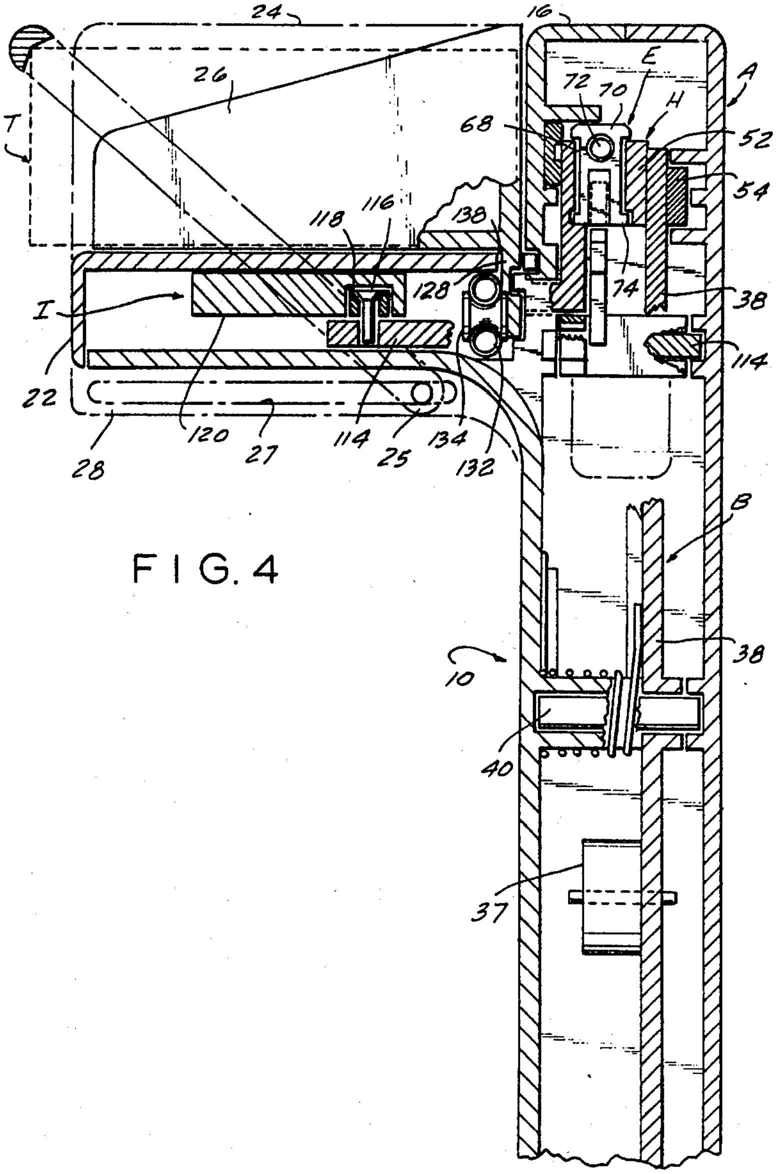
FIG. 4 is a front cross-sectional view of the tag dispensing and attaching apparatus of the present invention, taken along line 4—4 of FIG. 3.
Figure 5:
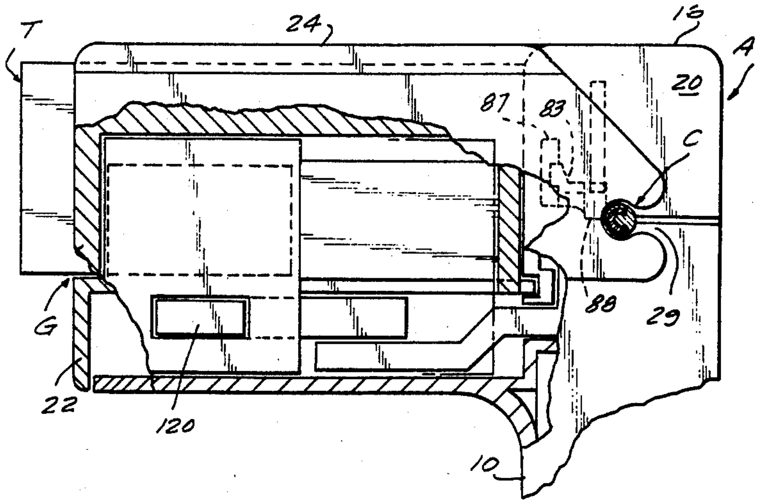
FIG. 5 is a partial front cut-away view of the tag dispensing portion of the tag dispensing and attaching apparatus of the present invention.

The outer edge of the tag stack is held in position by an adjustable arm 25 (see FIG. 4). One end of arm 25 is positioned adjustably mounted within a slot 27 on a downwardly extending part 28 affixed to the front of housing section 22.

An article 30 to be tagged is held against the front surface of anvil 24. Trigger 12 is depressed, causing a tag T to be moved into a position behind anvil 24 and in alignment with the path of movement of needle C. The depression of trigger 12 also causes a fastener to be severed from the fastener clip as it moves against knife edge 31, situated within housing A immediately behind needle C, and the T-bar end 32 thereof to be pushed into the needle. This occurs as the needle is advanced in the forward direction to pierce tag T, which is held in position behind anvil 24. It should be noted that anvil 24 has a needle receiving opening 29 such that it does not interfere with the forward movement of needle C. The needle is latched in this position so that it can be used as a probe to locate the exact position on the article where the fastener is to be placed.

Trigger 14 is then actuated, causing the T-bar end 32 of the fastener F to be dispensed through needle C such that it is situated on the opposite side of article 30. Housing A and article 30 are then moved apart such that the tag T carried by the fastener F is removed from housing A.

As illustrated in FIG. 1, after the tagging operation is complete, the T-bar end 32 of the fastener F is situated on one side of the article 30 and the paddle end 34 of the fastener is situated on the opposite side of tag T. The filament 36 of the fastener passes through openings in the article 30 and the tag T such that tag T is now connected to article 30 and cannot be removed therefrom without cutting the filament 36.

As illustrated in FIG. 2, trigger 12 has an internal part 12*a* which is situated adjacent a roller 37 mounted on the bottom end of a lever 38. Lever 38 is pivotally mounted within handle portion 10 of housing A at point 40. When trigger 12 is depressed, lever 38 will pivot about point 40 in an arc against the action of a torsion spring 42. Spring 42 has outwardly extending arms situated between the interior surface of an upwardly extending part 44 of grip 10 and the interior surface of the rear wall 46 of lever 38. Spring 42 urges the upper portion of lever 38 toward the rear of housing A, as shown in solid in FIG. 2.

The upper end 48 of lever 38 has a rounded configuration and is situated within a recess 50 in a slide 52. Slide 52 comprises the means for moving needle mounting means D. Recess 50 is defined between a pair of outwardly extending rounded parts 54, 56 of slide 52. This configuration is designed to permit upper end 48 of lever 38 to be moved relative to slide 52 in a smooth, non-binding manner.

As lever 38 is pivoted, slide 52 will move within housing A from a rear position (shown in solid in FIG. 2) proximate the rear wall of housing A to a forward position (shown in phantom in FIG. 2) near the front wall of the interior of the housing. The movement of slide 52 within housing A is guided by a track 58 which protrudes from the interior surface of the housing wall. As slide 52 approaches its forward position, it will engage needle mounting means D and move same forward to cause needle C to intersect the plane of anvil 24.

At the bottom of slide 52 is a cavity 60 into which a latch spring 62 is received. Latch spring 62 has a downwardly projecting finger 64 having an inclined forward portion 64*a* and a rear portion 64*b* which is substantially perpendicular to the path of movement of slide 52.

Extending into the interior of housing A from track 58 at the forward portion thereof, is a member 66 which cooperates with latch spring 62 to retain slide 52 in its forward position. Member 66 has an inclined or rounded rear surface which cooperates with portion 64*a* of finger 64 to cam the finger out of alignment with member 66 as slide 52 is moved in the forward direction. When slide 52 reaches the end of its forward motion, the resiliency of finger 64 will cause the finger to lodge in front of the forward surface of member 66. Finger 64 will remain in this position until it is pushed upwardly by the actuation of trigger 14. Latch spring 62 cooperates with member 66 to retain slide 52 in its forward position until it is released.

As best seen in FIG. 4, slide 52 has a recess 68 within which is movably mounted a second slide 70. Recess 68 is substantially larger (in length) than slide 70 so as to permit limited relative movement between slide 70 and slide 52. Slide 70 carries a forwardly extending plunger 72 on its forward wall 74. Plunger 72 moves in a path in alignment with the bore in needle C and functions to push the T-bar end 32 of fastener F through needle C.

Slide 70 is spring loaded toward the rear of recess 68 in slide 52 by a compression spring 75 extending therebetween. As slide 52 moves towards its forward position, spring 75 causes slide 70 to remain at the rear of recess 68. As slide 52 moves forward plunger 72 will engage the rear end of the T-bar 32 of a fastener F and move same so as to sever fastener F from the remainder of the clip and then to an intermediate position within needle C.

When slide 52 is in its forward position, a protruding finger 80, carried on pivotable arm 82, which forms the means J for moving the fastener moving means E. Arm 82, which is integral with trigger 14, will be situated in a position spaced behind wall 74 of slide 70, and out of alignment with the path of movement of slide 52. Trigger 14 is pivotally mounted on housing A at point 84. When trigger 14 is depressed (see FIG. 7), arm 82 will rotate about point 84 such that finger 80 engages the rear surface of wall 74 and causes slide 70 to move forward relative to slide 52, compressing spring 75. This will cause the tip of plunger 72 to move all the way through needle C and dispense the T-bar end 32 of fastener F from needle C.

Trigger 14 also has a rear lobe 86 on the interior portion thereof. Lobe 86 is aligned with finger 64 of latch spring 62 such that when trigger 14 is depressed, lobe 86 will engage finger 64 and move same upwardly such that portion **64*b* clears part 66. When latch spring 62 clears part 66, slide 52, and slide 70 carried thereby, will move rearwardly back to its original position due to the urging of torsion spring 42 against lever 38**. This will also cause needle mounting means D to return to its original position.

Slide 52 has a protrusion 83 extending from the side thereof. Protrusion 83 is situated within an elongated slot 85 on a member 87, the forward portion of which forms a flexible pawl 88.

As slide 52 moves rearwardly, protrusion 83 engages the rear wall of slot 85 causing member 87, including a pawl 88, to move rearwardly a small distance to index a fastener feed wheel 90 in the counterclock-wise direction. Protrusion 83 and slot 85 function as a "lost motion" connection such that slide 52 can move relative to member 87 without causing movement of member 87 except at the extreme ends of the path of movement of slide 52. At the rear end of the path of movement of slide 52 member 87, and thus pawl 88, move rearwardly, indexing wheel 90 and is then depressed, away from wheel 90 through the interaction between a protrusion 97 on pawl 88 and a pin 99 on the housing wall (see FIG. 7). At the front end of the path of movement of slide 52, member 87, and thus pawl 88, move forwardly, a short distance, camming it past the spoke adjacent to it, such that it is positioned for the next indexing of wheel 90.

It should be noted that a spring loaded flexible pawl 91, pivotally mounted near the top surface of housing A, normally serves to prevent wheel 90 from rotating in the clockwise direction. Pawl 91 prevents feed wheel 90 from rotating as member 87 is moved forward to permit pawl 88 to cam past the adjacent spoke, so as to be positioned for the next indexing of wheel 90.

Pawl 91 also has a second function. A pushbutton 93, which forms a part of pawl 91, is accessible from the exterior of housing A through opening 95 and is provided to disengage pawl 91 from feed wheel 90 when depressed. This is possible because of the flexibility of the material from which pawl 91 is made. Once pawl 91 is disengaged, wheel 90 can rotate freely in the clockwise direction (as long as pawl 88 is in the depressed position), permitting the clip of fasteners F to be removed from the apparatus, if necessary.

Feed wheel 90 has a plurality of outwardly extending spaced spokes along its periphery. These spokes are received in the openings between fasteners F (which are spaced along the runner bar of the clip) and engage the individual fasteners F such that the fasteners are moved in step-wise sequence through the gun as wheel 90 is indexed. This causes the T-bar 32 of each fastener F, in sequence, to align with plunger 72 and the bore in needle C. The T-bar end 32 of the next fastener F is fed into the ejection position automatically, in sequence, as slide 52 returns to its original position.

As noted above, slide 52, as it is moved forward, engages the rear end of needle mounting means D. Means D comprises a movably mounted part 94 into which the base 96 of needle C is held by a needle release mechanism 98. The base 96 of needle C is manufactured with a side indentation along its mid-section. The shaft 100 of a needle engaging mechanism 98 is situated to be received in the indentation (see FIG. 7). Shaft 100 has a semicircular cross-sectional configuration such that when it is rotated by needle release knob 102 to a first position, the shaft 100 is situated within the indentation in the needle base 96 so as to hold the needle base securely within part 94. When handle part 102 is rotated 180°, shaft 100 is no longer situated within the indentation in needle base 96 and needle C can be moved forwardly relative to part 94 and removed from housing A.

Figure 3:
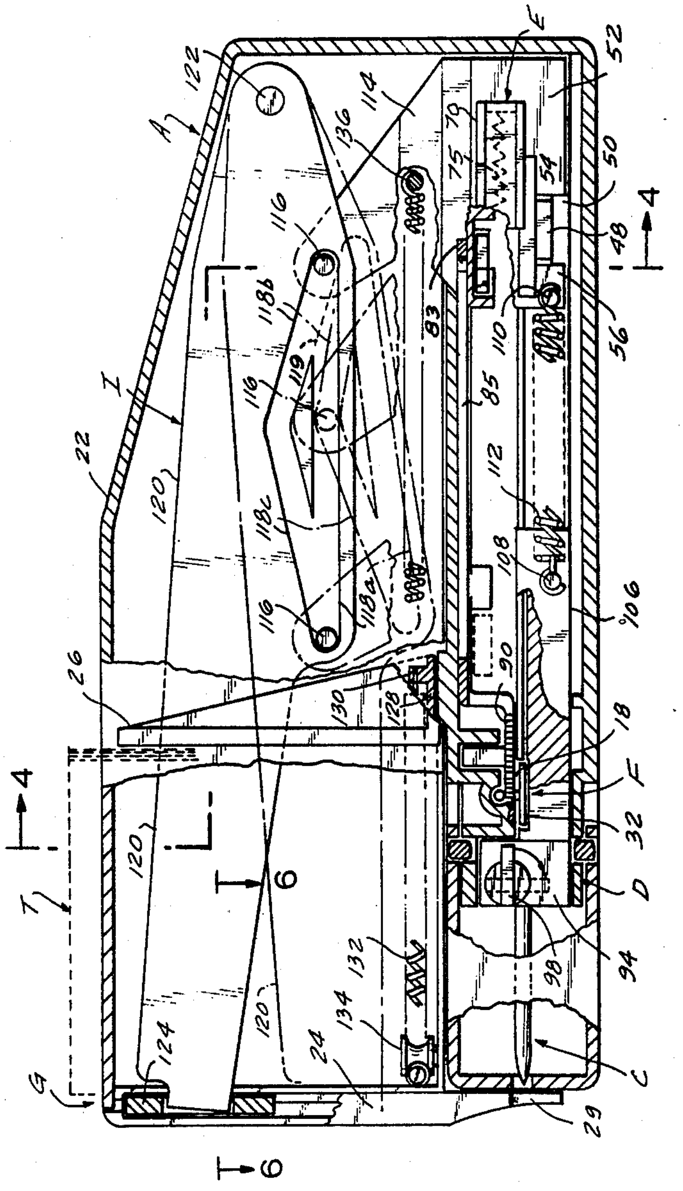
FIG. 3 is a top cross-sectional view of the tag dispensing and attaching apparatus of the present invention, illustrating operation of the tag dispensing portion.

As is best seen in FIG. 3, part 94 has a rearwardly extending portion 106 (aligned with part 56 on slide 52) which carries an upwardly extending protrusion 108. A similar upwardly extending protrusion 110 is situated on part 56 of slide 52. Extending between protrusions 108 and 110 is a tension spring 112 which operably connects part 94 with slide 52. As slide 52 moves forward, spring 112 is relaxed, and part 56 on slide 52 engages the rear of portion 106, pushing portion 106 and, thus, part 94 forward such that needle C moves forward. As slide 52 returns to its original position, proximate the rear of housing A, spring 112 extends, urges part 94 to move backwards, and needle C to retract.

As best seen in FIGS. 3 and 4, an arm 114 extends outwardly from the lower side portion of slide 52. Arm 114 carries an upwardly extending pin 116 on the outer lobe thereof. Pin 116 is situated within a cam track 118 located on the lower surface of a lever 120. The rear end of lever 120 is pivotally mounted to housing A at pivot 122 such that lever 120 can move through a limited arc within section 22 of housing A.

The forward end of lever 120 (left, as seen in FIG. 3) is received within a recess in a tag slide 124 which is movable within anvil 24 from an original position (upper position seen in FIG. 3) aligned with the stack of tags T, and a feed position (lower position, as seen in FIG. 3) wherein a tag engaged by slide 124 is in alignment with needle C. As slide 52 is moved forward, lever 120 will move from its original position to the feed position, and then back to its original position. The rearward movement of slide 52 will have no effect on the position of lever 120.

Cam track 118 is a continuous loop having two different paths between the rearwardmost point and the forwardmost point. One section **118*a* of the track 118 is a straight line between the rearwardmost point of the track and the forwardmost point of the track, parallel to the axis of the aparatus. When lever 120 is in its original position, this section permits slide 52 to return from its forward position to its rear position without effecting the position of lever 120. The other section of track 118** comprises two parts 118*b* and 118*c* which meet at an angle, preferably less than 180°.

As slide 52 moves forward, pin 116 first moves along part 118*b* of track 118 such that lever 120 pivots toward needle C. The configuration of the surface of the cam track includes a step 119 which guides pin 116 into part 118*b*, instead of section 118*a*, during the initial portion of its forward movement. As pin 116 reaches the intersection between parts 118*b* and 118*c*, lever 120 is situated at the point closest to needle C, having engaged a tag from the stack and moved it into alignment with needle C. Further forward movement of slide 52 causes pin 116 to ride along part 118*c* of track 118 such that lever 120 reverses direction and moves away from needle C. As pin 116 reaches the forwardmost point in the track, lever 120 has returned to its original position. The return of slide 52 from its forward to its rearward position causes pin 116 to move along portion 118*a* of the track, without moving lever 120.

Figure 6:
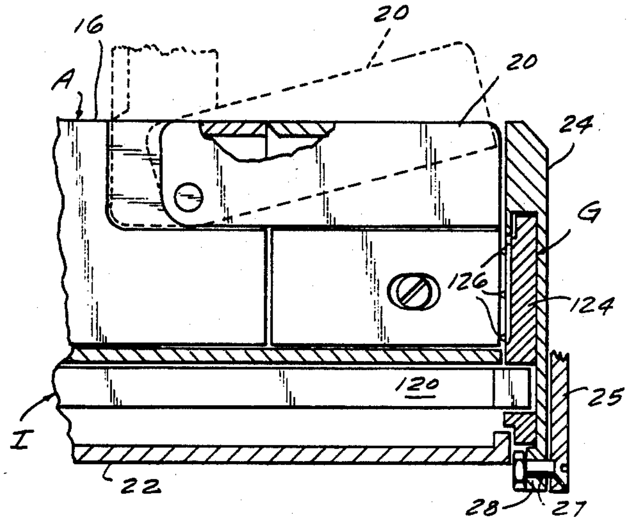
FIG. 6 is a side view of the tag dispensing portion of the tag dispensing and attaching apparatus of the present invention.

As best seen in FIG. 6, tag slide 124 has a plurality of tag engaging teeth 126 on its internal surface. Teeth 126 serve to engage the surface of the first tag T on the stack, which is urged forward by pressure plate 26. Teeth 126 are shaped to engage the tag in one direction and to permit relative movement therebetween in the other direction. As slide 124 moves toward needle C, the tag engaged thereby will move with it, aligning with the path of movement of needle C. As pin 116 reaches the intersection of track parts 118*b* and 118*c*, needle mounting means D and, thus, needle C have moved forward to its extended position, such that the tip of needle C pierces the engaged tag. Anvil 24 holds the engaged tag firmly as needle C penetrates same. Anvil 24 has a needle receiving opening 29 therein so as not to interfere with the forward movement of the needle.

As slide 52 continues to move forward, tag slide 124 moves away from needle C, towards its original position. As this occurs, teeth 126 release the surface of the tag, which is now held in position by the needle, such that the tag slide 124 retracts without the tag. At the end of the forward movement of slide 52, tag slide 124 is fully retracted and teeth 126 are in a position to engage the surface of the next tag in the stack.

Pressure plate 26, as best seen in FIGS. 3 and 4, is spring-loaded towards the front of the apparatus to hold tags T securely. Pressure plate 26 has a downwardly extending portion 128 which carries a horizontally extending protrusion 130. One end of a spring 132 is anchored to protrusion 130. Spring 132 extends around a roller 134, mounted near the front of the housing section 22, and then rearwardly towards the back of housing A where the other end thereof is affixed to an upwardly extending protrusion 136 mounted to housing A.

Downwardly extending portion 128 of pressure plate 26 rides along a slot 138 between the upper surface of housing section 22 and the main portion of housing A so as to guide the movement of the pressure plate. Spring 132 serves to urge pressure plate 26 towards anvil 24 in a substantially uniform manner, even when a large number of tags are situated between the pressure plate 26 and the anvil 24. The length of spring 132 and the method of mounting thereof assures a substantially uniform pressure, regardless of the size of the stack. The position of roller 134 can be adjusted such that the amount of pressure applied to the stack by spring 132 is never so great as to interfere with the movement of the first tag in the stack relative to the remainder of the stack. Thus, jamming is effectively eliminated.

Figure 9:
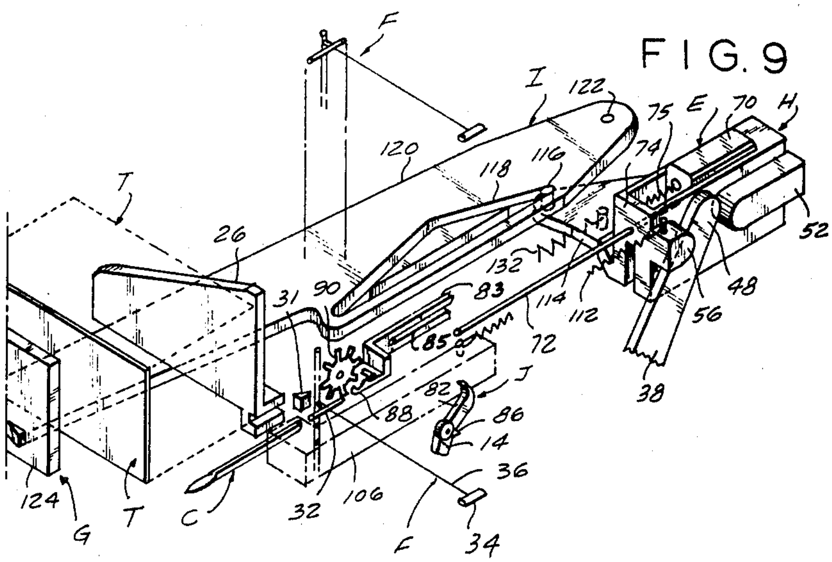
FIGS. 9 through 12 are schematic views of the tag dispensing and attaching apparatus of the present invention, showing variou stages of the tagging sequence.

FIGS. 9 through 12 schematically illustrate the operation of the apparatus of the present invention. FIG. 9 shows all parts in their initial positions. After loading a clip of fasteners F into the apparatus and situating a stack of tags T between anvil 24 and pressure plate 26, the front end of the apparatus is held adjacent the article to be tagged. Trigger 12 is depressed. The depressing of trigger 12 causes lever 38 to move slide 52 forward.

Figure 10:
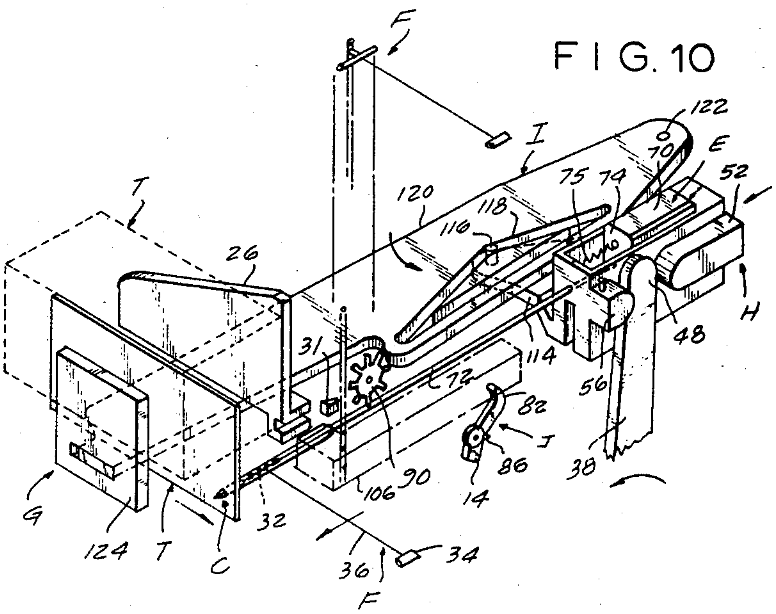

The forward movement of slide 52 causes several operations to occur. Slide 52 carries along with it slide 70 (spring-loaded against the rear of recess 66). Slide 70 has plunger 72 mounted to the front end thereof. The tip of plunger 72 will engage the T-bar end 32 of a fastener F aligned with needle C causing it to be severed from the clip and moved forward into the bore of needle C. The forward movement of slide 52 (through arm 114, pin 116, and track 118) will also cause lever 120 to move tag slide 124 form its original position, adjacent the stack, to a position proxiamte needle C, such that the first tag on the stack will be in alignment with needle C. This position is shown in FIG. 10.

Figure 11:
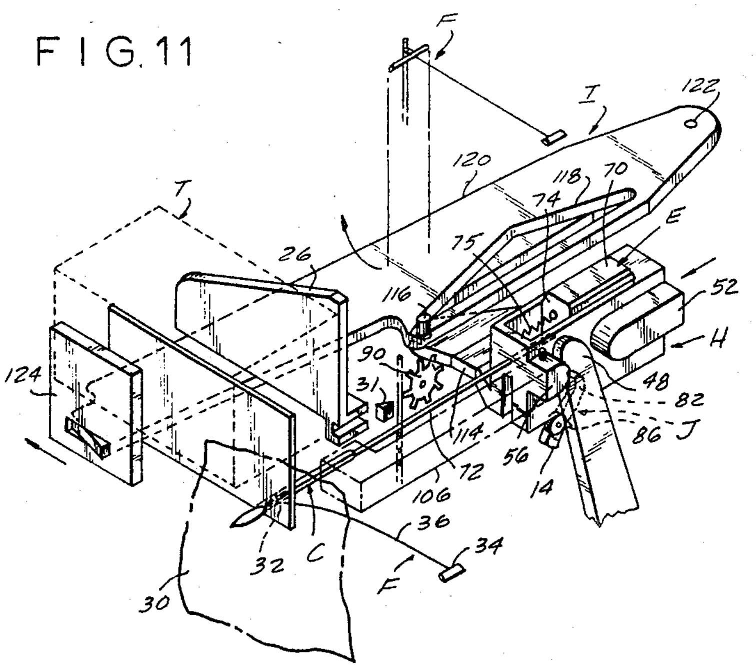
Figure 12:
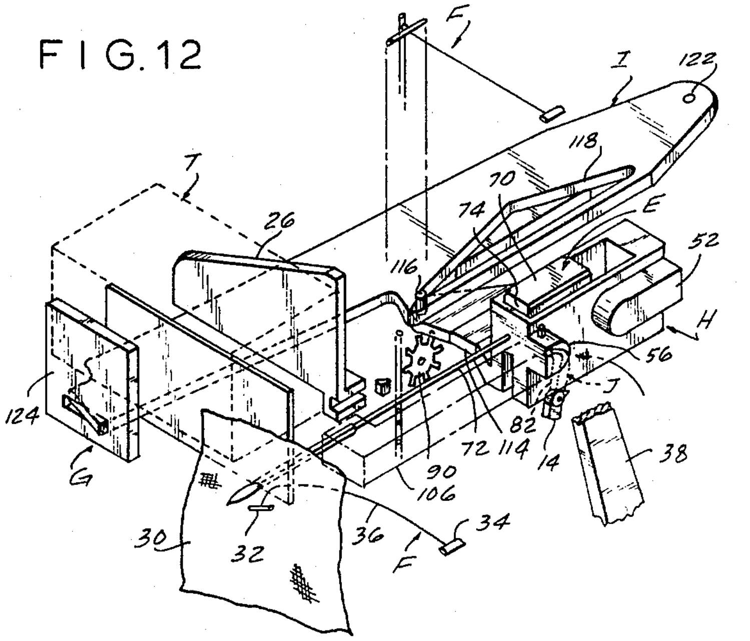

Further forward movement of slide 52 will first cause part 94, and thus needle C, to move forward, piercing the aligned tag and then cause lever 120 to move back towards its original position, causing slide 124 to return to a position in alignment with the tag stack. This is illustrated in FIG. 11.

At this point, the operator depresses trigger 14. This causes slide 70 to move forward relative to slide 52 (within recess 68) such that the T-bar end 32 of fastener F is moved through and pushed out of the end of needle C. At the same time, the depression of trigger 14 causes lobe 86 to engage finger 64 of the latch spring 62, and release the latch, permitting slide 52 to move back toward its rearward position due to the urging of torsion spring 42. As slide 52 returns to its rearward position, pin 116 rides along track section 118*a* without causing movement of tag slide 124. However, slide 52 causes part 94 and, thus, needle C to retract to its original position, through the action of spring 112, which interconnects slide 52 with section 106 of part 94. In addition, as slide 52 retracts, feed wheel 90 is advanced by the action of pawl 88 such that the T-bar end 32 of the next fastener F is automatically aligned with the needle bore. Upon completion of the rearward movement of slide 52, the apparatus again appears as illustrated in FIG. 9. The apparatus and article 30 can then be moved apart such that the tag, now loosely retained behind anvil 24, can be easily removed from the apparatus. The apparatus is now ready for the next tagging operation.

It will now be appreciated that the present invention relates to a tag dispensing and attaching apparatus which facilitates the tagging operation without fatiguing the operator. This is accomplished by automatically feeding a tag into alignment with an advancing needle, by depressing a first trigger. A second trigger is then depressed to dispense the fastener through the tag and the article to be tagged. Thus, the apparatus is operated entirely by the squeezing of triggers, the pressure of which can be regulated such that operator fatigue is greatly reduced.

Fatigue is further reduced because the apparatus is light in weight, easily manipulatable, and can be operated by a single hand of the operator. It is mechanically simple, operates reliably, and constructed relatively of inexpensive parts which cooperate together for a long, useful life with a minimum of maintenance.

The apparatus is designed to utilize conventional plastic fasteners which are inexpensive and widely available from a number of different companies. The apparatus is designed for use with tags of a variety of different dimensions and can operate satisfactorily with large numbers of tags without jamming.

It should also be appreciated that although the apparatus of the present invention is primarily designed for hand-held use and has thus been described for this mode of operation, the apparatus could easily be adapted for use for powered operations. In such operations, external means such as pneumatic cylinders, solenoids, or the like, could be utilized to depress trigger 14 on command and automatically cycle to depress trigger 12 a specified time after the depression of trigger 14. This would virtually completely automate the tagging operation.

FIGS. 13 through 30 illustrate a second preferred embodiment of the present invention. The second preferred embodiment includes a tag engaging mechanism on the tag feed slide which utilizes the driving force to cause a tag engaging pin to grip a tag and thereafter move the tag into alignment with the needle. The mechanism automatically releases the tag as the slide is retracted. This insures positive gripping of the tag as it is moved in the aligned position and, at the same time, prevents the tag from being scratched or ripped as the slide retracts.

Another feature included in the second embodiment is a different mechanism for transferring force from the actuator to the tag slide. In the first embodiment, depression of the actuator caused reciprocation of the slide from its remote position to a position where an engaged tag was aligned with the needle and back to the remote position. Thus, movement of the slide and advancement of the needle occurred simultaneously. In the second embodiment, these functions occur sequentially. Initial depression of the actuator causes the slide to engage a tag and move same into alignment with the needle. Further depression of the actuator causes the needle to penetrate the aligned tag. It is only after the fastener has been dispensed and the actuator is returning to the undepressed position through action of the spring that the slide returns to its original position.

Other alternative structures are also present in the second embodiment. For example, the second embodiment utilizes a standard indexing wheel-type fastener feed, a different latch mechanism, a spring loaded front end portion, and a different slide structure.

Figure 13:
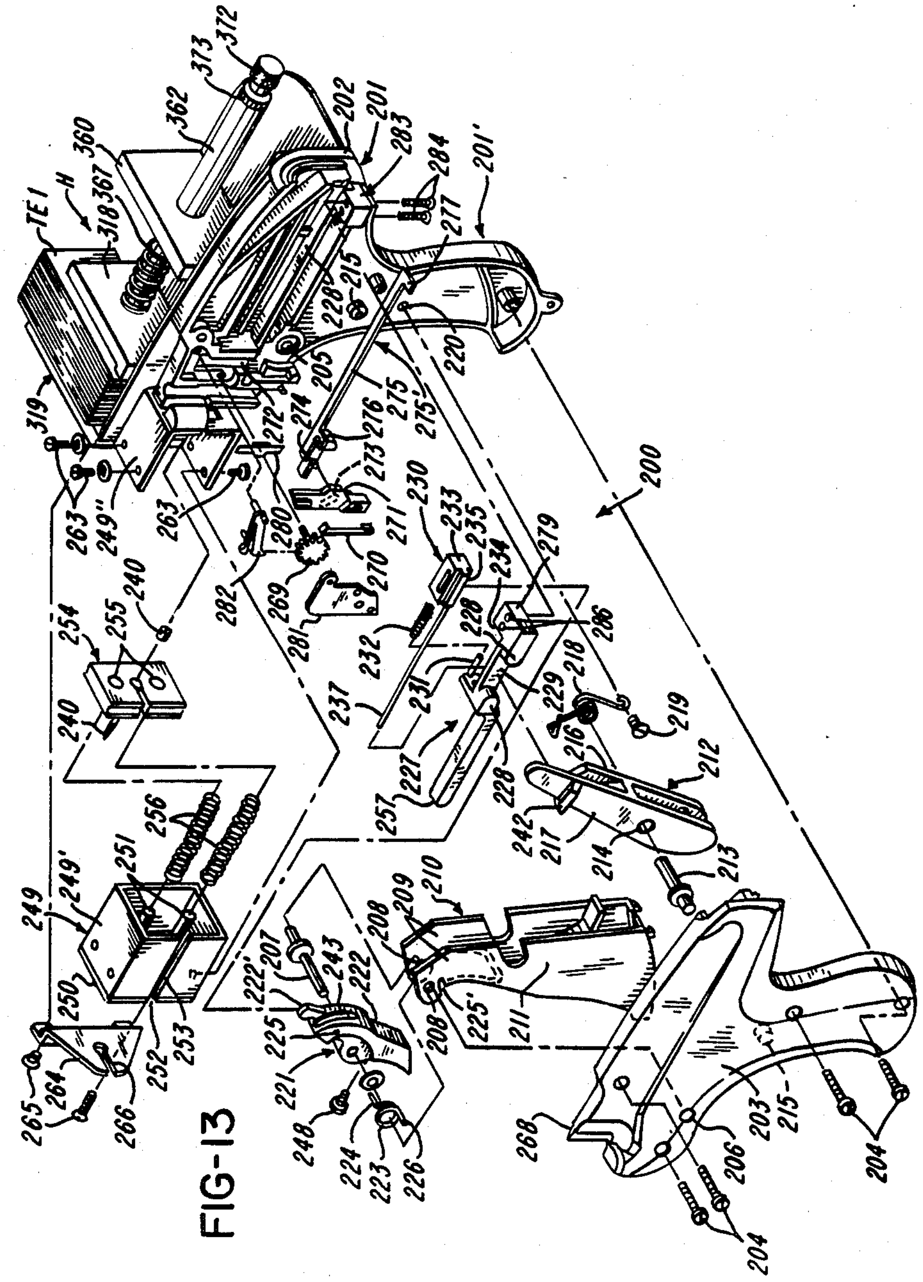
FIG. 13 is a partly exploded view of another embodiment of the tag dispensing and attaching apparatus or tag attacher of the present invention.
Figure 14:
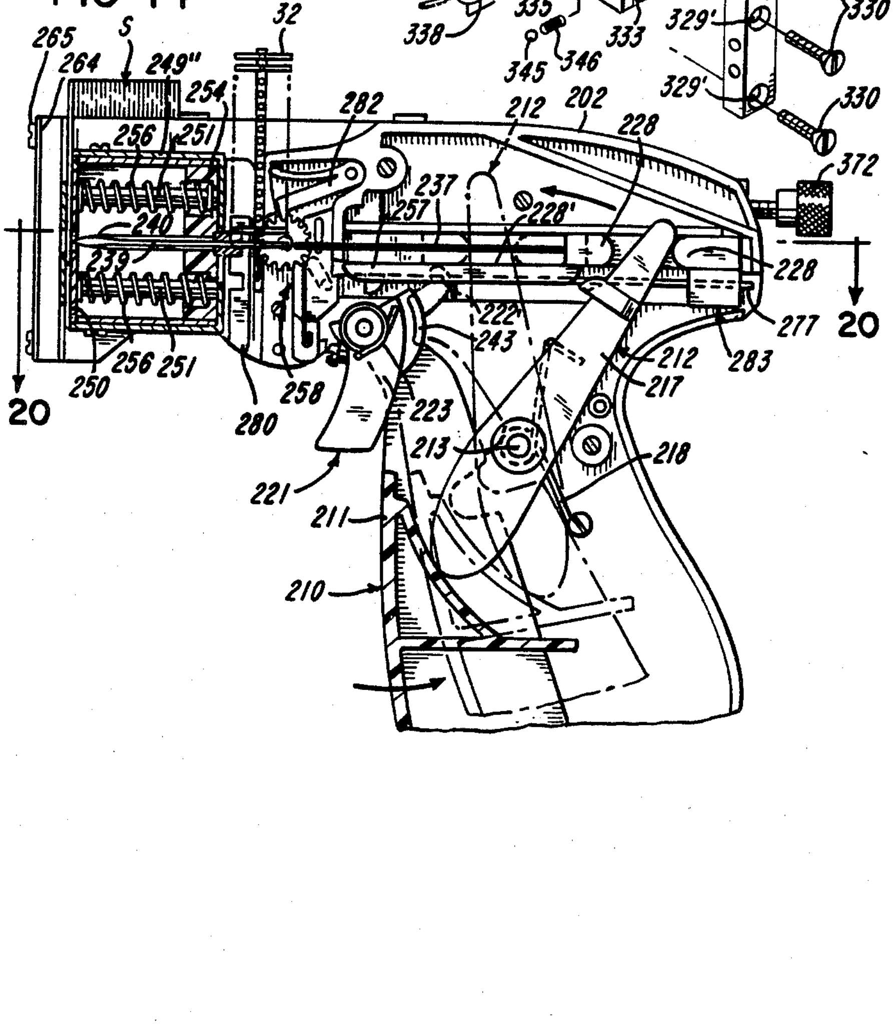
FIG. 14 is a partly broken away side elevational view of the tag attacher shown in FIG. 13, with solid lines depicting an initial or home position and phantom lines depicting another position between the initial position and an actuated position.

With reference to FIG. 13, there is shown a hand-held tag attacher generally indicated at 200 having a body or frame generally indicated at 201. The body 201 includes a body section 202 and a body section 203 secured together by screws 204. The body sections 202 and 203 include a manually engageable handle 201'. The body sections 202 and 203 have respective holes 205 and 206 for mounting a shaft or pivot 207. The shaft 207 extends through holes 208 in spaced wall members 209 of an actuator generally indicated at 210. The actuator 210 comprises a trigger or lever 211 pivotally mounted by the shaft 207. A lever generally indicated at 212 is pivotally mounted on a shaft 213 which passes through a hole 214 and extends into holes 215 in body sections 202 and 203. The lever 212 has a pair of generally upwardly extending arms 216 and 217. A spiral spring 218 received about the shaft 213 between the lever 212 and the body section 202 is secured at one end portion to the arm 216 and at its other end portion to the body 202 by a screw 219 received in a hole 220. The spring 218 urges the lever 212 clockwise (FIGS. 13 and 14) and the lever 212 in turn cams the lever 211 clockwise (FIGS. 13 and 14).

Another actuator generally indigated at 221 is also pivotally mounted on the shaft 207. The actuator 221 comprises a lever or trigger 222 disposed between the wall members 209. A spiral spring 223 received about the shaft 207 is secured at one end portion 224 in a hole 225 in the lever 222 and at its other end portion 226 engages the actuator 210 at cutout 225'.

A slide generally indicated at 227 is guided in a track 228' for straight line reciprocating movement. The slide 227 includes a pair of spaced projections 228 defining a slot 229 which receives the arm 217 of the lever 212. The slide 227 is shown to mount or carry another slide generally indicated at 230. The slide 227 has a rod 231 about which a compression spring 232 is received. The spring 232 bears at its one end portion against the slide 227. The other end portion of the spring 232 fits into a recess 230' (FIG. 20) in the slide 230 and urges terminal end 233 of the slide 230 against face 234 of the slide 227. The slide 230 has a tongue 235 which fits into a groove 236 (FIG. 20) in the slide 227. A push rod 237 secured to the slide 230 passes through a hole 238 in the slide 227. The push rod 237 is aligned with a needle bore 239 of a needle 240. A bar section 32 of a fastener F is shown in FIG. 14 to be aligned with the push rod 237 and with the needle bore 239. Manual operation of the actuator 210 will pivot the actuator 210 counterclockwise (FIG. 14) which will pivot the lever 212 counterclockwise and will move the slide 227 and the slide 230 which it carries forward (to the left in FIG. 14). The push rod 237, however, moves only partially between its initial and its actuated position to a partially actuated position in which the aligned bar section 32 is in a position inside the needle bore 239 (FIG. 15).

As the lever 212 moves to its actuated position, a latch generally indicated at 241 in FIGS. 15, 17 and 18 latches the lever 212 to the lever 222. A tooth 242 is secured to the arm 217 and can engage an arcuate tooth or ridge 243 on the lever 222. The arm 217 is somewhat flexible and resilient and can deflect as the lever 212 moves in the direction of arrow 244 in FIG. 17 and encounters the ridge 243. As shown in FIG. 17, the tooth 242 has a cam surface 245 which cooperates with a cam surface 246 on the tooth 243 to facilitate latching of the lever 212. When the tooth 242 clears the tooth or ridge 243 during movement of the lever 212 in the direction of arrow 244, the arm 217 returns resiliently to cause the tooth 242 to snap into the position shown in FIG. 18. The latch 241 prevents the lever 212 from being returned to its initial position by the spring 218 until the actuator 221 is operated. It should be noted that the convenient disposition at the handle 201' of actuators 210 and 221 enables the actuator 210 to be operated by the user's middle, ring and small fingers and enables the actuator 221 to be operated by the user's index finger. In order to eject or push the bar section 32 the rest of the way out of the needle bore 239, the user operates the actuator 221 using the index finger. The lever 222 has an arm 222', which in the position of FIGS. 14 and 15, is clear of the path of movement of the slide 227, but in the position of FIG. 15 can move into a pocket or recess 227' in the slide 227.

As seen in FIG. 15, lever 212 is latched to the lever 222 by the latch 241. The lever 212 remains latched against return under the influence of the spring 218. As the lever 221 is moved from its initial position to its actuated position shown in FIG. 16 the tooth 243 slides along the tooth 242 until the tooth 243 clears the tooth 242. FIG. 16 shows the lever 212 returning to its initial position because the latch 241 has been tripped by the action of the tooth 243 clearing the tooth 242. Thus, the termination or terminal end 247 of the tooth 243 is considered to be a tripping means. A stop screw 248 enables the stop position of the lever 222 to be adjusted. The screw 248 determines when during the cycle of the attacher 200 the latch 241 is tripped. As shown in FIG. 16, the latch 241 is not tripped until the push rod 237 has pushed the bar section 32 out of confinement in the needle bore 239.

With reference to FIGS. 13 and 14, the body 201 is shown to include mounting structure generally indicated at 249. The structure 249 is suitably secured to the front end portion of the body section 202. The body section 202 has a front wall 250 to which vertically spaced guide pins 251 are mounted. The front wall 250 has a keyhole-shaped slot 252 and the mounting structure 249 has a side opening or slot 253. A slide 254 has vertically spaced through-holes 255 in which the guide pins 251 are received. The pins 251 guide the slide 254 for straight line sliding movement. Compression springs 256 received about respective guide pins 251 bear against the front wall 250 and against the slide 254. In the initial or retracted position of the slide 254 and the needle 240 the springs 251 are under light loading. The springs 251 are relatively weak and only need be strong enough to assure that the slide 254 and the needle 240 which it mounts will move from the extended or actuated position of FIG. 16 to the initial or retracted position of FIG. 14.

It is seen in FIGS. 13 and 14 through 16 that the slide 227 has an integrally molded actuator or driver 257 which is adapted to move the slide 254 from the retracted position (FIG. 14) to the extended or actuated position (FIGS. 15 and 16). As best shown in FIG. 14, the driver 257 is spaced from the needle slide 254 and this provides a lost-motion connection 258 between the actuator 257 and the slide 254. When the slide 227 and the actuator 257 which it carries have moved to the extended position (FIGS. 15 and 16), the actuator 257 has moved through an aperture 259 in rear wall 260 of the mounting structure 249 and has moved the slide 254 to a position in which pointed end 262 of the needle 240 has passed through a tag T at an attaching or advanced position and through merchandise M. The mounting structure 249 includes members 249' and 249" secured together by screws 263. In the position shown in FIG. 15, the springs 256 are compressed to a greater extent than in the position of FIG. 14. When the latch 241 is tripped, the retracted positions and the springs 256 return the slide 254 and the needle 240 to the retracted position.

It should be noted that when the actuator 221 is moved to its actuated position following latching of the latch 241, the arm 222' enters the recess 227' in the slide 227 and pushes on surface 227" to move the push rod 237 from the partially actuated position of FIG. 15 to the actuated position shown in FIG. 16, thereby ejecting the bar section 32 from the needle 240. When the arm 222' pushes on the surface 227' the slide 230 moves forward relative to the slide 227 and compresses the spring 232. When the actuator 221 is released, the spring 232 return the slide 230 to its initial position relative to the slide 227 in which rear face 233 of the slide 230 is again in abutting contact with the face 234 of the slide 227.

With reference to FIG. 20, the body 201 is shown to have a guideway 266 for receiving a clip C of the fasteners F The clip C has bar sections 32 and button sections 34 joined by respective filament sections 36. The bar sections 32 are joined to a rod or runner F1 by connectors F2. The guideway 266 is comprised in part by guide portion 267 (FIG. 19) of the body section 202 and in remainder by surface 268 (FIG. 20) of body section 203. The guideway 266 guides the clip C so that a toothed feed wheel 269 or the like engages or meshes with the connectors F2. A flexible resilient spring finger 270 mounted on a slide 271 cooperates with the toothed wheel 269 to advance the clip C by one pitch or bar section-to-bar section distance. The slide 271 is slidably mounted for straight line movement in a guideway 272 (FIG. 13) formed by the body 201. The slide 271 has an inclined cam track 273 which receives a pin 274 on a slide 275. The slide 275 has a pair of speed projections or abutments 276 and 277 which provide a lost-motion connection 275'. The slide 227 fits between the projections 276 and 277. Abutment face 279 on the slide 227 is adapted to contact the projection 277.

It should be noted that the actuator 221 has a front surface 276' which cooperates with the projection 276 when the actuator 221 is actuated from its position shown in FIG. 15 to its position shown in FIG. 16 to move the slide 275 a short distance in the forward direction, that is, to the left in FIGS. 13 and 14 for example. This movement of the slide 275 causes the pin 274 in cooperation with the cam slot or track 273 to move the slide 271 downwardly as viewed in FIGS. 13 and 14 for example, thereby moving the spring finger 270 over a tooth of the toothed wheel 269 and thus cocking the spring finger 270. No motion is thereby imparted to the toothed wheel 269. When the latch 241 is tripped, the lever 212 returns to its initial position and moves the slide 227 rearwardly as viewed in FIGS. 13 and 14 for example. When the abutment face 279 contacts and pushes on the abutment 277 near the end of travel of the slide 227, the slide 227 moves the slide 275 rearwardly as viewed in FIG. 16 for example. This causes the pin 274 cooperating with the cam slot 273 to move the slide 271 and the spring finger 270 upwardly. The spring finger 270 cooperates with a tooth of the toothed wheel 269 to advance the toothed wheel 269 to bring the next bar section 32 into alignment with the needle bore 239.

With reference to FIGS. 13 and 14, there is shown a knife 280 which severs the bar section 32 from the respective connector F2 when the push rod 237 first starts to push on the bar section 32. A plate 281 is disposed between the toothed wheel 269 and the push rod 237. A manually releasably anti-backup pawl 282 detents the toothed wheel 269.

Figure 19:
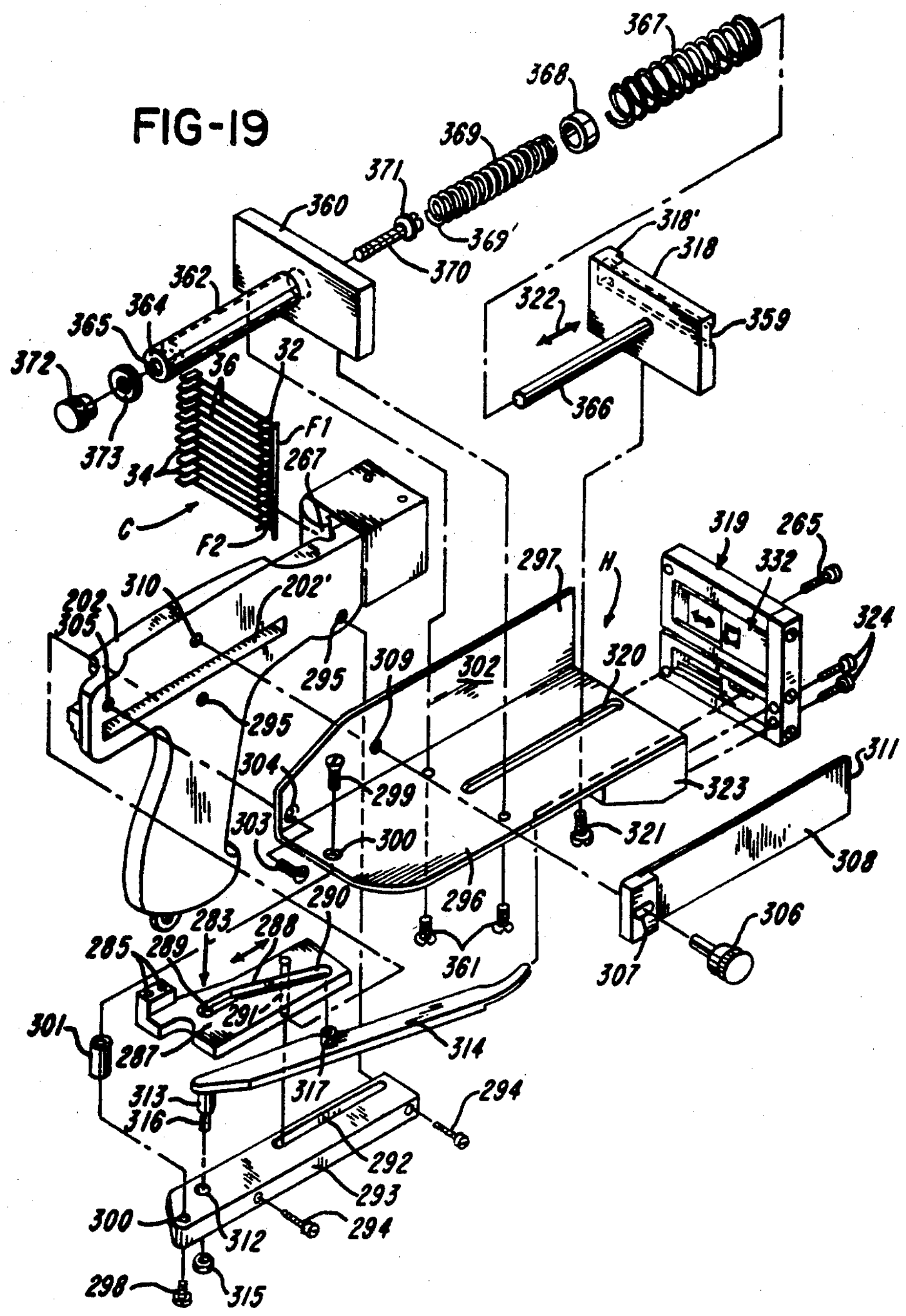
FIG. 19 is a partly exploded view showing in particular the the tag feeder and a portion of the drive mechanism for the tag feeder.

With reference to FIGS. 13 and 19, a cam generally indicated at 283 extends through a slot 202' in the body section 202 and is connected to the slide 227 by screws 284. The screws 284 pass through holes 285 in the cam 283 and are threaded into holes 286 in the slide 227. Because the slide 227 moves in a straight line, the cam 283 also moves in a straight line. The cam 283 comprises a cam plate 287 with a cam track or slot 288. The track 288 has a dwell portion and an inclined or ramp portion 290. A pin 291 secured to the cam plate 287 is received in a straight guide slot 292 in a guide plate 293. The guide plate 293 is secured to the body section 202 by screws 294 threadably received in holes 295. A hopper is generally indicated at H'. The guide plate 293 is also secured to a floor or bottom 296 of an angle-shaped hopper member 297 of the hopper H' by screws 298 and 299 passing through respective holes 300 and received in a tubular spacer 301. The hopper member 297 also has an upstanding wall 302. A screw 303 passes through a hole 304 in the wall 302 and is threadably received in a hole 305 in the body section 202. A thumb screw 306 passes through an elongated slot 307 in a gate 308, through a hole 309 in the wall 302, and is threadably received in a hole 310 in the body section 202. By loosening the thumb screw 306 the position of the gate 308 can be adjusted so that the terminal end 311 of the gate 308 only allows one tag at a time to be fed to the attaching position. This adjustment also enables the gate opening to be varied to accommodate tags of different thicknesses.

The plate 293 also has a hole 312 for receiving a pivot pin 313 secured to a lever 314. A nut 315 received by a threaded portion 316 of the pin 313 retains the pivot pin 313 in the hole 312. The lever 314 rotatably mounts a roller 317 received in the cam track 290. Initially the cam plate 287 is in the position shown in FIG. 19. The roller 317 is at or near one end of the ramp portion 290 of the cam track 288. As the slide 227 moves forward, the cam 283 also moves forward and the lever 314 is urged counterclockwise (FIG. 19) until the roller 317 encounters the dwell portion 289 of the cam track 288. As the cam 283 continues to move forward, no movement is imparted to the lever 314 because the dwell portion 289 is aligned with the line of movement of the cam 283.

As illustrated in FIG. 19, the cam 283 and the lever 314 are disposed beneath the bottom 296. The stack S of tags T is supported by the bottom 296. The stack S is also positioned against the gate 308. A pressure plate 318 bears against endmost tag TE1 at one end of the stack S and urges the stack S toward front wall or wall member generally indicated at 319. The bottom 296 has an elongated guide slot 320. A screw 321 extends through the slot 320 and is threadably received in the lower portion of the pressure plate 318. The screw 321 guides the pressure plate 318 along the groove 320, but the head of the screw 321 is not tightened against the bottom 296 so that the pressure plate 318 can move freely along a straight line in the directions of arrow 322. A bracket 323 secured to the underside of the bottom 296 mounts the wall member 319. Screws 324 pass through the wall member 319 and are threadably received by the bracket 323.

Figure 21:
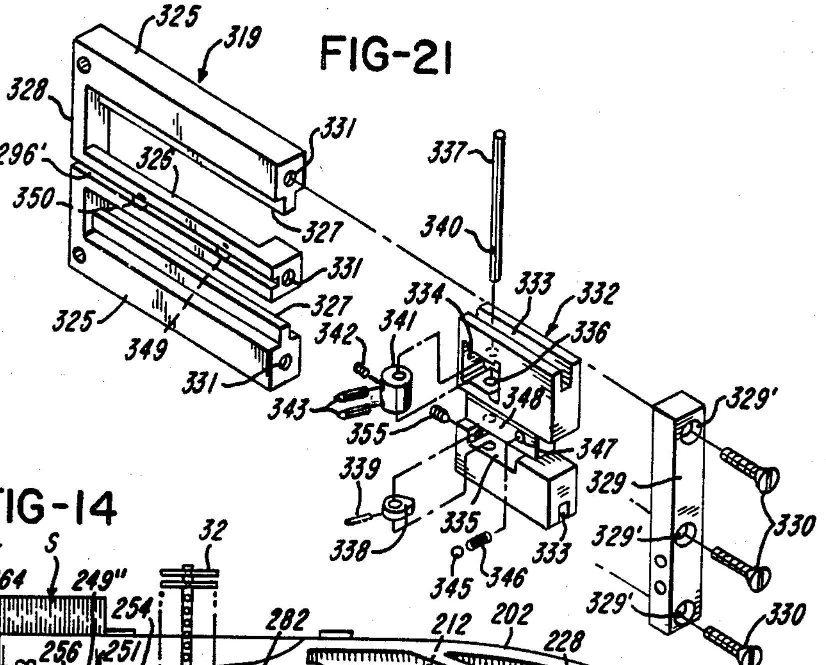
FIG. 21 is an exploded view of the tag feeder and mounting for the tag feeder.

With reference to FIG. 21, the wall member 319 is shown to have a pair of spaced guide members 325 and a support 326 spaced between the guide members 325. The support member 326 has a groove 296' for receiving the front end of the plate 296. The guide members 325 have tongues or guides 327. The guide members 325 and the support 326 are joined to a connecting member 328. Another connecting member 329 is secured to the guide members 325 and to the support 326 by screws 330 which pass through holes 329' and are threadably received in holes 331. The guide members 325 slidably mount a slide generally indicated at 332. The slide 332 is shown to have grooves 333 into which the tongues or guides 327 extend. The tongues 327 cooperate with the grooves 333 and guide the slide 332 for free sliding movement. The slide 332 has a pair of spaced cutouts 334 and 335. A hole 336 aligned with the cutouts 334 and 335 rotatably receives a shaft 337. An arm or lever 338 is disposed at the cutout 335 and is secured to the shaft by a pin 339. The pin 339 is received by the arm 338 and passes through a hole 340 in the shaft 337. An annular hub 341 is disposed at the cutout 334 and is adjustably secured to the shaft 337 by a set screw 342. The hub 341 receives feed pins 343.

As shown in FIGS. 21, 25 and 26, for example, there is provided an arrangement or means generally indicated at 344 for providing resistance to movement of the slide 332 at the initial or retracted position (FIG. 25) of the slide 332 and at the extended or attaching position (FIG. 26), but provides virtually no resistance to movement of the slide 332 between its initial position and its extended position. The resistance providing arrangement 344 includes a yieldable member specifically a ball 345 urged by a spring 346. The spring 346 is received in a hole or recess 347 in a reduced thickness section 348 of the slide 332. The ball 345 projects out of the recess 347 in the positions shown in FIGS. 25 and 26. In the FIG. 25 position, the ball 345 is in a recess 349 in the support 326. The ball 345 cooperates with the recess 349 by detenting action to releasably hold the slide 332 in that position. In the FIG. 26 position, the ball 345 is in the recess 350 in the support 326. The ball 345 cooperates with the recess 350 by detenting action to releasably hold the slide 332 in that position.

With reference to FIGS. 20 and 22, the slide 332 is shown in its initial or retracted position. The lever 314 has an end portion 351 which extends through the cutout 335. One surface 352 of the end portion 351 is shown in contact with wall 353 of the slide 332. The arm 338 is disposed between a surface 354 and an adjustable stop screw 355 threadably received in the slide 332. The stop position of the arm 338 against the screw 355 determines the rotational position of the shaft 337 and in turn determines the feeding position of the feed pins 343. As also shown in FIG. 22, the feed pins 343 are out of feeding engagement with the endmost tag TE in the stack S.

During the early portion of the cycle of operation, the cam 283 moves forward, that is, toward the left side of FIG. 20, and this causes the lever 314 to be cammed in a counterclockwise direction. As the surface 354 of the end portion 351 moves into contact with the arm 338, the arm 338 is moved counterclockwise to the position shown in FIG. 23, and this causes the feed pins 343 to move into feeding engagement with the endmost tag TE. In so doing, the points 356 (FIGS. 29 and 30) of the feed pins 343 penetrate the endmost tag TE. The pins move from the position shown in FIG. 22 to the position shown in FIG. 23 without any movement being imparted to the slide 332. This assures that the points 356 of the pins 343 are embedded into the endmost tag TE before the tag TE is attempted to be moved forward to the attaching position shown in FIG. 24.

It is preferred that the slide 332 itself offer low resistance to sliding in order to minimize operator fatigue, as the invention pertains to a hand-held tag attacher 200 powered only by the operator (without the assistance of external power sources). The simple yet effective resistance device 344 provides adequate initial resistance to hold the slide 332 releasably in the initial or retracted position shown in FIGS. 20 and 22 until the feed pins 343 have moved into feeding engagement with the endmost tag TE. It should be noted that the lever 314 applies force directly to the feed pins 343 through the arm 338 and the rod 337 and not to the slide 332 when the lever 314 moves counterclockwise (FIGS. 20 and 22).

As the force applied by the lever 314 increases and overcomes the force of the resistance means 344, the slide 332 moves from the position shown in FIGS. 20, 22 and 23 toward the position shown in FIG. 24, and in so doing the ball 345 moves out of the recess 349 and rides on surface 357 of the support 326 which lies between the receses 349 and 350. As the slide 332 is composed of molded plastics material, the ball 345 rides easily with low friction on the surface 357. As the slide 332 is driven by the lever 314, the feed pins 343 remain embedded in the tag TE because of the driving force applied by the lever 314. More particularly, the arm 338 is held against the stop screw 355 so that the angle at which the pins 343 attack the tag TE is always the same. The stop screw 355 enables the angle of attack A' (FIG. 29) to be manually adjusted to optimize the engagement of the feed pins 343 with the tag TE. When the slide 332 arrives at its forward or advanced position shown in FIG. 26, the ball 354 enters the recess 350. The tag TE is now in the forward or attaching position as shown in FIG. 24.

It is seen in FIG. 22 that the end edges T1 of the tags T in the stack S are against the gate 308. The end edges T1 of the tags T are thus in a straight line. Because the feed pins 343 always positively engage the endmost tag TE in the stack S before the slide 332 is moved and because the slide 332 always moves through the same distance, the end edge T1 is always brought to the same position relative to the axis 240' (FIG. 24) of the needle 240. This is important because the tag TE should not be fed at a position in which the axis 240'0 intersects the tag TE too close to the end edge T1 which could result if the feed pins 343 only engaged the tag TE after the slide 332 started moving toward the attaching position. Also, the hole in the tag TE made by the needle should not be through preprinting on the tag TE.

When the slide 332 has been fed to the position shown in FIG. 26, the cam 283 is in a position in which the roller 317 is at the dwell portion 289. Therefore, continued forward movement of the slide 227 and of the cam 283 does not impart any further movement to the lever 314. As the slide 227 continues to move forward the needle slide 254 is moved forward by the actuator 257 and the needle 240 is pushed through and makes its own hole in the tag TE. After the bar section 32 is pushed through the needle 240 by the push rod 237, by operation first of the actuator 210 and by operation second of the actuator 221, the latch 241 is tripped and the , slide 227 returns to its initial or retracted position (FIG. 13). In that the cam 283 is connected directly to the slide 227, the cam 283 also returns to its initial position (FIG. 19). As the cam moves rearwardly, no motion is imparted to the lever 314 because the follower 317 is in the dwell portion 289 of the cam track 288. As soon as the follower 317 moves along the ramp portion 290, the lever 314 is moved clockwise about pivot pin 313. This movement of the lever 314 continues until the cam 283 is in its initial position shown in FIGS. 19 and 20, at which the ball 345 again enters the recess 349.

The action of the slide 332 and the lever 314 before their return to their initial positions should now be examined. When the slide 332 is in the position of FIG. 26, the resistance means 344 holds the slide 332 in its forward or extended position. As the lever 314 moves clockwise (FIG. 26), the surface 352 of the lever 314 moves against the surface 353 of the slide 332. When the surface 352 is against the surface 353, the surface 354 of the lever 314 is out of contact with the arm 338. Thus, there is now no force acting on the arm 338 causing the pins 343 to remain at their feeding angle of attack '. When the force exerted by the lever 314 overcomes the force of the resistance means 344, the slide 332 can return to its retracted position. The resistance means 344 is effective to prevent the slide 332 from moving out of its extended position (FIG. 26) until driven out by the lever 314. This assures that there is enough space between the arm 338 and the surface 354 to enable the arm 338 (the shaft 337 and the feed pins 343) to rotate before the slide 332 starts returning to its initial position. This assures that the feed pins 343 will not drag on the surface of the tag TE as the slide 332 returns.

Figure 29:
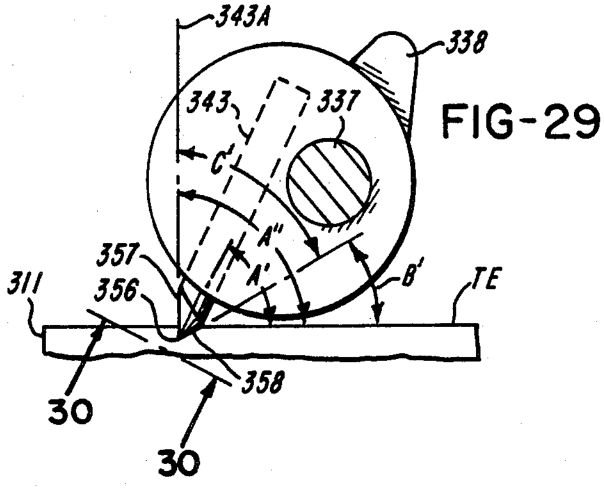
FIG. 29 is an enlarged view showing one of the feed pins in engagement with the tag.
Figure 30:
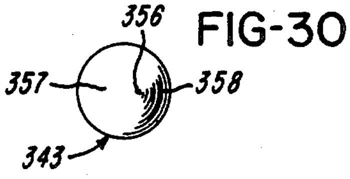
FIG. 30 is a view generally along 30—30 of FIG. 29.

The feed pins 343 are identical and are identically oriented. With reference now to FIGS. 29 and 30, the configurations and orientation of the feed pins 343 is illustrated in greater detail. Although the end portion of each feed pin 343 is generally cone-shaped, it is ground so that each feed pin 343 can easily move into feeding engagement with the tag TE as the feed pins 343 move from the position shown in FIG. 22 to the position shown in FIG. 23, and also so that the feed pins 343 can easily thereafter move out of feeding engagement with the tag TE as the feed pins move from the position shown in FIG. 24 to the position shown in FIG. 25. As best shown in FIG. 29, the front face 357 of the feed pin 343 is along a line 343A generally perpendicular to the tag TE. The angle A" is about 90° or less to assure that the pin 343 is not cammed out of feeding engagement with the tag TE during advancement of the slide 332. Rear face 358 of each feed pin 343 makes an angle B, of about 30° with the tag TE. The included angle C' made by the front and rear faces 357 and 358 is about 60°. Although other angles can be used, it is most advantageous that the pins 343 can readily engage and thereafter disengage from the tag TE. It is apparent that the pins 343 attack the tag TE at an acute angle A' (shown to be about 60° ) so as to be self-energizing during feeding movement, toward the left in FIG. 29, of the pins 343.

The pressure plate 318 has a pressure-concentrating projection 318' adjacent end 311 of the gate 308 to assure the endmost tag TE is against the end wall 319 at the end 311. With reference to FIG. 19, the pressure plate 318 has a groove 359 extending from end-to-end in its front face to provide clearance for the feed pins 343 in the event the operator operates the tag attacher 200 without having any tag T in the hopper H. This will obviate scoring the pressure plate 318 and dulling the feed pins 343. The feed pins 343 are, however, removable for replacement if necessary with new sharp pins, if desired. The feed pins 343 are simply press-fitted into holes in the hub 341.

With reference to FIG. 19, a plate or bracket 360 is secured to the floor 296 by screws 361. A tube 362 is secured to the plate 360 in alignment with a hole 363 in the plate 360. The tube 362 has a reduced end portion 364 with a threaded hole 365. A rod 366 secured to the pressure plate 318 extends through a light spring 367, a tubular washer 368 and a short distance into a spring 369 which is heavier than the spring 367. A screw 370 has a head 371 which abuts terminal end 369' of the spring 369. The screw 370 is threaded into the hole 365 and a knob 372 is tightened against the end portion of the screw 370. The pressure which the springs 367 and 369 exert on the pressure plate 318 can be regulated by turning the knob 372. A lock nut 373 can hold the screw 370 in any adjusted position. The tube 362 enables a relatively long spring or set of springs to be used. The longer the springs, the more constant is the force exerted by the pressure plate 318 against the stack S throughout the travel of the pressure plate 318.

With reference now to the general operation of the hand-held tag attacher 200, let it be assumed that a clip C of fasteners F has been loaded into the attacher 200 to a position in the guide slot 266 in which a bar section 32 of a fastener F is in alignment with the needle bore 239 and the push rod 237. The clip C is advanced to this position by manually operating the actuator 210 one or more times. Now a stack S of tags T can be loaded into the hopper H as shown in FIG. 13 for example.

With the handle 201' held in the operator's hand, the middle, ring and small fingers are used to operate the actuator 210 and move it counterclowckwise from its initial position shown in FIG. 14 to its actuated position shown in FIG. 15. Movement of the actuator 210 away from its initial position, rotates the lever 212 counterclockwise against the force of the return spring 218. The lever 212 moves the slide 227, the slide 230 and the push rod 237 out of their retracted positions. Only a small amount of movement of the push rod 237 causes the bar section 32 to move relative to the knife 280 to sever the bar section 32 from the respective connector F2 and as movement of the push rod 237 continues, the bar section 32 is moved further and further along the needle bore 239. While the slide 227 is moving forward, the cam 283 also moves forward, thus pivoting the lever 314 counterclockwise (FIG. 20) to cause the feed pins 343 to move into feeding engagement with the endmost tag TE and thereafter move the slide 332 from its retracted position (FIG. 20) to its extended position (FIG. 24). Movement of the slide 332 ceases when the slide 332 contacts the member 328 which occurs when the roller 317 is at the dwell portion 289. when the lever 212 has moved to the position shown in FIG. 15, the teeth 242 and 243 have engaged to latch the latch 241. In addition, the actuator 257 has moved the needle slide 254 to the position shown in FIG. 15 in which the needle 240 has moved forward along axis 240' to pierce a hole in the tag TE and pass through the merchandise M, and also the push rod 237 has moved the bar section 32 to a partially advanced position along the needle bore 239. Now the operator can operate the actuator 221 using the index finger Operation of the actuator 221 causes arm 222' to move the slide 230 forward relative to the slide 227 to eject the bar section 32 and to trip the latch 241. Operation of the actuator 221 also causes the face 276' to push against the abutment 276 to move the slide 271 and the pawl 270 downwardly. As soon as the latch 241 is tripped by the tooth 242 losing engagement with the tooth 243, the return spring 218 starts returning the lever 212 to its initial position (FIG. 14). Release of the actuator 221 causes return spring 223 to move the actuator 221 clockwise from the position shown in FIG. 16. As arm 222' of the actuator 221 moves clockwise, the springs 256 move the needle slide 254 and the needle 240 which it mounts toward the retracted position (FIG. 14). The attacher 200 can now be moved relative to the merchandise M so that the filament section 36 can pass out of the slots 253, 252 and 266. Also, the spring 232 moves the slide 230 rearwardly until its end face 233 contacts the face 234 on the slide 227. As the slide 227 nears its retracted position shown in FIG. 14, the face 279 of the slide 227 contacts abutment 277 and moves the slide 275 rearwardly to move the slide 271 and the feed pawl 270 upwardly to advance the toothed wheel 269 by one pitch. During return of the slide 227, the cam 283 also moves rearwardly and at first the roller 317 cooperates only with the dwell portion 289 but thereafter when the roller 317 cooperates with the ramp portion 290, the lever 314 is pivoted clockwise and the slide 332 is returned to its retracted position. This completes one cycle of operation, and the attacher 200 is now ready for another cycle.

It can sometimes happen that, during use of a tag attacher, a jam occurs. This may be due for example to defective fasteners. The hand-held tag attacher of both disclosed embodiments is powered totally by the operator applying force to the actuating means disposed at the handle. The operator can cause tags to be fed one-by-one from the hopper, advance the clip of fasteners and move the push rod solely by the operator-supplied energy. The operator has the "feel" of the tag attacher and can sense a jam and hence can readily interrupt the cycle to avoid aggrevating the jam and/or damaging the tag attacher. Air or electrically operated tag attachers lack this advantage.

While only two preferred embodiments of the present invention have been disclosed herein for purposes of illustration, it is obvious that many variations and modifications could be made thereto. It is intended to cover all of these variations and modifications which fall within the scope of the present invention, as defined by the following claims.

I claim:

1. Method of attaching tags to merchandise using fasteners, with each fastener having a bar section and a button section joined by a filament section, comprising the steps of: providing a hand-held tag attacher having a manually engageable handle, a hopper adapted to receive a stack of tags, and a feed pin movably mounted on a slide, applying a force to the feed pin for moving the feed pin to a stop position at a predetermined acute angle of attack with respect to the tag and for thereafter moving the pin and the slide to move the tag to an attaching position while maintaining the feed pin at the predetermined angle of attack, the tag being in alignment with a needle having a needle bore and a side opening when the tag is at the attaching position, making a hole in the tag by driving the needle through the tag at the attaching position, inserting the needle through the merchandise, and driving a bar section of a fastener through the needle bore, the tag and merchandise while the related filament section extends through the side opening.

2. Method of attaching tags to merchandise using fasteners, with each fastener having a bar section and a button section joined by a filament section, comprising the steps of: providing a hand-held tag attacher having a manually engageable handle, a hopper adapted to receive a stack of tags, and a feed pin mounted on a slide, applying holding force against the slide to hold the slide releasably in a retracted position, applying force to the feed pin for moving the feed pin from an ineffective position out of feeding engagement with a face of an endmost tag in the stack to an effective position in feeding engagement with the face of the endmost tag, force for moving the feed pin being operative to move the slide from the retracted position to an attaching position when the holding force is overcome, the tag being in alignment with a needle having a needle bore and a side opening when the tag is at the attaching position, making a hole in the tag by driving the needle through the tag at the attaching position, inserting the needle through the merchandise, and driving a bar section of a fastener through the needle bore, the tag and merchandise while the related filament section extends through the side opening.

3. Method as defined in claim 1, further including the step of returning the slide to the retracted position without applying any force to the feed pin to enable the feed pin to return to its ineffective position.

4. Method of attaching tags to merchandise using fasteners, with each fastener having a bar section and a button section joined by a filament section, comprising the steps of: providing a hand-held tag attacher having a manually engageable handle, a hopper adapted to receive a stack of tags, and a feed pin, applying a first force to the feed pin for moving the feed pin from an ineffective position out of feeding engagement with an endmost tag in the stack to an effective position in feeding engagement with the endmost tag while simultaneously applying a second force in opposition to the first force to prevent the pin from moving to feed the tag, moving the feed pin to feed a tag to an attaching position when the first force overcomes the second force, the tag being in alignment with a needle having a needle bore and a side opening when the tag is in the attaching position, thereafter making a hole in the tag, inserting the needle through the merchandise, and thereafter driving a bar section of a fastener through the needle bore, the tag and merchandise while the related filament section extends through the side opening.

5. Method of attaching tags to merchandise using fasteners, with each fastener having a bar section and a button section joined by a filament section, comprising the steps of: providing a hand-held tag attacher having a manually engageable handle, a hopper adapted to receive a stack of tags, and a feed pin, applying force to the feed pin for moving the feed pin laterally from an ineffective position out of feeding engagement with a face of an endmost tag in the stack to an effective position in feeding engagement with the face of the endmost tag with the feed pin being at an acute angle of attack against the face of the tag, so that during continued application of the force the acute angle of attack helps hold the feed pin in self-energizing relationship in feeding engagement and the continued application of force moves the feed pin and hence the endmost tag to an attaching position into alignment with a needle having a needle bore and a side opening, making a hole in the tag by driving the needle through the tag at the attching position, inserting the needle through the merchandise, and driving a bar section of fastener through the needle bore, the tag and merchandise while the related filament section extends through the side opening.

6. Method of attaching tags as defined in claim 5, including the step of resisting movement of the feed pin in the longitudinal direction until the feed pin has moved from the ineffective position to the effective feeding position.

7. Method as defined in claim 5, wherein the step of moving the feed pin includes rotating the pin from the ineffective position to the effective position, and resisting tag feeding movement of the feed pin until the feed pin has rotated from the ineffective position to the effective position.

8. Method as defined in claim 7, wherein the step of moving the feed pin includes rotating the pin from the ineffective position to the effective position.

9. Method of attaching tags to merchandise using fasteners, with each fastener having a bar section and a button section joined by a filament section, comprising the steps of: providing a hand-held tag attacher having a manually engageable handle, a hopper adaptd to receive a stack of tags, and a feed pin, moving the feed pin from an ineffective position out of feeding engagement with an outer face of an endmost tag in the stack to an effective position at an acute angle of attack in feeding engagement with the outer face of the endmost tag, moving the feed pin longitudinally while the feed pin is in feeding engagement with the endmost tag to separate the endmost tag from the remainder of the stack and to feed the separated tag to an attaching position in alignment with a needle having a needle bore and a side opening, making a hole in the tag by driving the needle through the tag at the attaching position, inserting the needle through the merchandise, and driving a bar section of a fastener through the needle bore, the tag and merchandise while the related filament section extends through the side opening.

* * * * *